$$\alpha_1' = \frac{\alpha_1 \cdot \alpha_2}{0.953\alpha_2 + 0.0462\alpha_1'}$$

$$\alpha\phi = \frac{\varepsilon_r \cdot \alpha_1' \cdot \alpha_2}{(\varepsilon_r - 1) \cdot \alpha_2 + \alpha_1'}$$

— $\varepsilon = \varepsilon_{nom} \neq f(\beta)$
--- $\varepsilon = \varepsilon_r' = f(\beta)$
—·— $\varepsilon = \varepsilon_r = f(\beta)$ $$\alpha'_1 = \left(1 + \frac{V_1}{V_2 - V_\phi}\right) \cdot \alpha_2 = 10.3 \cdot \alpha_2;$$
$$V_1 = 0.9 V_h; \quad V_2 = 0.1 V_h; \quad V_\phi = 0.003 V_h;$$
$$\alpha_\phi = \frac{\varepsilon \cdot \alpha'_1 \cdot \alpha_2}{\phantom{xxx}}$$

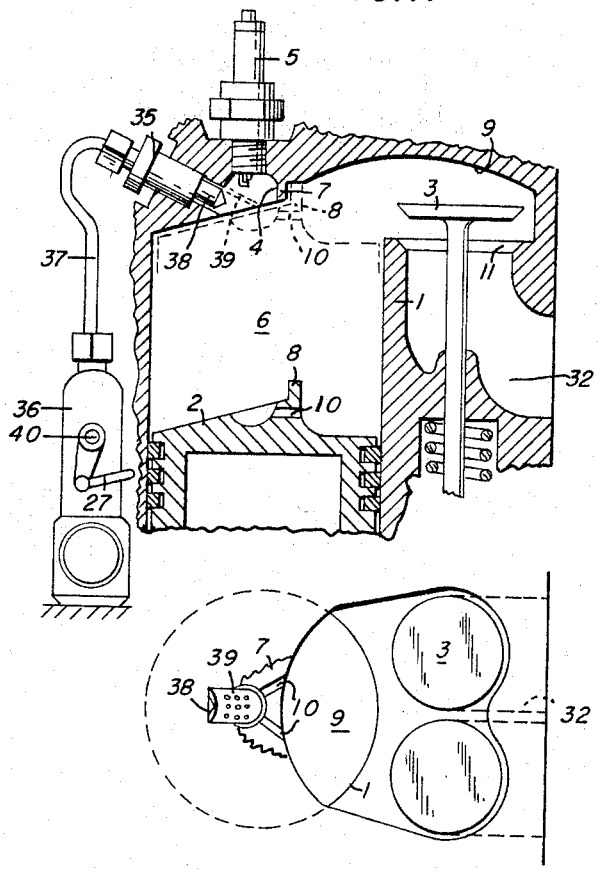

3,283,751
INTERNAL COMBUSTION ENGINE WITH JET IGNITION OF A NON-UNIFORMLY DISTRIBUTED WORKING MIXTURE FROM A PRECOMBUSTION CHAMBER CUT-OFF BY THE PISTON
David Abramovich Goossak and Lev Abramovich Goossak, Moscow, U.S.S.R., assignors to Institute Khimicheskoi Fysiki
Filed June 28, 1963, Ser. No. 291,453
22 Claims. (Cl. 123—32)

This invention relates to internal combustion engines and more specifically to the process of ignition and combustion therein. The object of the invention is to raise considerably the efficiency of the working process in the engines and improve the operating characteristics of the latter, as well as simplify the design of precombustion chamber engines.

It is known that one of the radical means for raising the efficiency of the working process in carburetor type engines and in engines with direct fuel injection is the use of a precombustion chamber ignition method. The general constructional design of such method of ignition has been long known. Among a large number of constructional designs for precombustion chamber engines, there have been more complicated and less complicated proposals. However, in almost all such engines, use has been made of a precombustion chamber permanently separated from the main combustion chamber, with the former being supplied with an auxiliary mixture through an independent valve arrangement with automatic or mechanical control.

In all known constructional designs of precombustion chamber engines, use has been made of one general method of ignition of the working mixture based on a trivial conception of the process of ignition and combustion as being a thermal process only. In such engines, for ignition of the working mixture, use has been made of a jet of flame on a jet of complete combustion products having a maximum possible heat content and maximum combustion temperature (hot flame ignition). In all cases, this has been achieved by regulation of the auxiliary mixture in the precombustion chamber for its composition to approach the stoichiometrical (normal proportions), or be of a degree suitable for proper combustion, or possess the highest ability of ignition in the precombustion chamber and for formation of a "sharp jetlike flame" (the same highly-inflammable composition which will be contained therein until ignited into a sharp jetlike flame).

Provision has been made for the jetlike flame to pass from the precombustion chamber into the main combustion chamber without rupturing or damping. For this purpose, the precombusion chamber has been made to communicate with the main combustion chamber through large area nozzles of the Laval or Venturi type with smoothly curved inlet and outlet edges. In order to ensure adequate preheating for the dependable ignition of the working mixture, the precombustion chamber has been made of a considerable volume reaching 15% to 35% or 0.1 to 0.5 of the volume of the main combustion chamber $V_c$. Thus, the precombustion chamber has always acted as a generator for the complete combustion products having a high temperature for the thermal ignition of the working mixture.

Subsequently, apparently in actual operation, it has been revealed that the method of ignition by means of a jet of flame, or by a jet of high temperature, complete combustion products is inefficient and not dependable.

This would explain the fact that patents for various proposals and constructions of precombustion chamber engines have episodically appeared during a period of more than 50 years, and passed into technical archives.

In the middle 1960's, a new method appeared for the ignition of the working charge in precombustion chamber engines. It consisted in the concept that the working charge mixture was ignited by a jet of chemically active products into the main combustion chamber. Such products were generated in the precombustion chamber as a result of incomplete combustion of an auxiliary mixture of the same fuel with air, but of very rich composition with an air-fuel ratio of approximately 0.5, with a deficiency of about one half the amount of oxygen that would be required for complete combustion of the fuel.

With such a "rich" regulation of the precombustion chamber mixture, products of incomplete combustion were generated comprising a considerable concentration of incomplete combustion stable products, namely, carbon oxide CO and molecular hydrogen $H_2$, possessing the highest combustion temperature, as well as intermediate products of chemical reactions: peroxides, aldehydes, etc., possessing high chemical activity, especially atoms of hydrogen H and oxygen O, free radicals—hydroxyl OH, etc., possessing exceptionally high chemical activity. For dependable ignition and for most efficient combustion of the working mixture by means of a jet of chemically active products, a relatively small volume of the precombustion chamber generator $V_{pc}$ about 2–3% of the volume of the main combustion chamber $V_c$, and relatively small area precombustion chamber passages, through which the jets of incomplete combustion products flow from the precombustion chamber into the main combustion chamber, such passages being sharply profiled, without smoothly curved inlet and outlet edges are required. In such cases, nozzles of the Venturi or Laval type would be entirely inadmissible.

In spite of the fact that, as a result of incomplete combustion in the precombustion chamber of a small quantity of a rich composition auxiliary mixture, a small quantity of heat is generated, and that the temperature of the incomplete combustion products is of a considerably lower level, 600–800° C. less than the temperature of complete combustion products, the efficiency of the ignition and combustion method by means of a jet of incomplete combustion products was considerably higher. This could be explained as follows: With this method of precombustion chamber-jet ignition, the jet of flame from the precombustion chamber through nozzle holes of small area and sharply profiled breaks up and becomes extinguished. Owing to the turbulent breaking up of the precombustion chamber jet, turbulent formation of a statistically great number of small centers takes place in the main combustion chamber, and in such centers a small amount of chemically active products obtained from incomplete combustion of the auxiliary mixture is admixed to the working mixture.

Thus, in contradistinction to the precombustion chambers previously used as generators of thermal jet of flames or jet of complete combustion products possessing a maximum temperature, in this invention, the precombustion chamber is a generator of chemically active products obtained from incomplete combustion of a rich auxiliary mixture.

Developing the ramified chain reactions in the centers the chemically active particles cause their rapid ignition and intensive combustion of the working mixture. The speed of combustion increases 3–4 times, as compared with the speed of propagation of the flame in the case of spark ignition, while the process of combustion becomes exceptionally stable. This takes place when operating in a wide range of variations in the working mixture composition up to double leaning-out and more, together with a considerable concentration of complete combustion products in the working mixture.

Application of the method of precombustion chamber ignition of the working mixture by means of a jet of chemically active products, obtained from incomplete combustion of a rich auxiliary mixture in a precombustion chamber carburetor-type engine with a permanently separated precombustion chamber and with valve feed 10, allowed a considerable (10–15%) fuel economy and a substantial (by 10–15 points on the octane scale) rise of the antiknock value, as well as the elimination of injurious and noxious incomplete combustion products being exhausted into the atmosphere. Concentration of cancerogenous matter (3.4 benzyprene) in the exhaust for a precombustion chamber engine decreases 15–20 times, while the concentration of carbon monoxide decreases to practically zero.

These effects were dependably realized in various types of internal combustion engines, irrespective of their design, or of the time, place or duration of operation of the precombustion chamber engine.

However, essential complications in the design of precombustion chamber systems with a permanently separated precombustion chamber and valve feed therefor involved certain difficulties, extra production and operational costs, and to a certain extent limited the application of precombustion chamber-jet ignition, especially in the case of smaller engines.

On the other hand, it is known that production processing in modern engine engineering has reached a state where internal combustion engines consist of a minimum-optimum number of parts that perform definite operations, and any increase of such number renders production of the engine uneconomical, while any decrease renders operation of the engine impossible. At the same time, existing engines suffer from certain disadvantages and particularly with respect to efficiency of the combustion process. Elimination of these disadvantages and raising the engine efficiency involves the introduction of additional operations into the working process. It is considered that for the performance of such additional operations, an additional number of parts or assemblies would be required. However, this would involve extra engine production and operational costs that would nullify to a greater or lesser extent the effect of the higher efficiency of the new engine.

In solving the problem of raising the efficiency of the combustion process in internal combustion engines by the application of the method of precombustion chamber-jet ignition, applicants did so not by the way of adding new parts to perform new operations in the working process but rather by allotting new additional tasks to the existing parts for performing new functions. Thus, for combustion of the auxiliary mixture and the provision of a precombustion chamber jet, the design proposed does not require a separate precombustion chamber in the form of a space permanently separated from the main combustion chamber. In the new concept, the precombustion chamber is in the form of a temporary space cut off from the main combustion chamber by means of projections on the cylinder head and the piston when the latter reaches the top dead center. The passage or passages by way of which the precombustion chamber communicates with the main combustion chamber, is arranged in the projection of the cylinder head or piston. Scavenging of the precombustion chamber and the filling thereof with a rich mixture is effected not by means of a special additional precombustion chamber valve, as in known precombustion chamber engines, but by means of the existing cylinder inlet valve located under the seat of the latter, and close by the precombustion chamber space with a plug for ignition, and above the seat in the inlet gas duct located at the mouth of the passage for local admission of the rich mixture into the cylinder. This permits the exclusion from the design of the precombustion chamber engine all parts of the precombustion chamber valve and its control. Probably, this would not always be a simple solution, but applicants succeeded in solving this technological problem, to a large extent positively for various constructional designs of internal combustion engines.

The new precombustion chamber engines proposed by applicants are extremely simple both as regards the precombustion chamber system and the feed system, as compared with previously known constructional concepts. The new precombustion chamber engines consist essentially of the parts of existing engines and in no respect differ therefrom and modified only to a slight extent are the main combustion chamber and the piston. In addition, the feed inlet passage in carburetor type engines is modified, while in engines with direct fuel injection into the cylinder, only the location of the fuel injection nozzle is changed. These modifications are effected either by additional machining, or by altering the arrangement of the existing parts in the engine. In some cases, the total number of parts of the existing engine is not increased but rather, in the case of some carburetor type engines, it could even be reduced. Moreover, such simpler constructional schemes of precombustion chamber engines ensure more dependably the application of the most efficient principle of ignition and combustion of the working charge mixture by a jet of chemically active products of incomplete combustion of a rich auxiliary mixture that is ejected from the precombustion chamber through nozzle holes into the main combustion chamber.

This invention is primarily for application in engine construction in general, and particularly in automobile, tractor and transport engine construction.

The object of the invention is a considerable rise in fuel economy of internal combustion engines and is achieved due to an increase in the speed and completeness of combustion, as well as exceptional stability of the process of combustion of rich and especially lean working charge mixtures in applications of precombustion chamber-jet ignition.

A further object of our invention is a considerable increase in the speed of combustion of the working mixture, and turbulent dispersion by the precombustion chamber jet of the zones where chemically active particles may possibly accumulate up to detonation-hazardous concentrations, thus permitting the restriction of the appearance of detonation and the improvement of the antiknock value of the precombustion chamber engine. Rapid combustion and timely admission of heat into the working process cycle, without afterburning during the expansion stroke, and restriction of detonation permits the raising of the compression ratio and increasing of the factor of filling of the cylinder with the working charge, in order to increase the specific power of the precombustion chamber engine.

An object of this invention is also the elimination of noxious combustion products which is achieved by an increase in the degree of completeness of combustion of the working mixture, and as a result of the elimination of the use of rich mixtures, by using lean and semilean mixtures for all conditions of running of a precombustion chamber engine.

The principal object of this invention is the realization of the above effects which is achieved by the application of precombustion chamber-jet combustion, without incurring any appreciable additional production and operational costs of precombustion chamber engines. This is made possible by the application of an exceptionally simple constructional scheme with a precombustion chamber that is cut off by the piston, and with a valveless feed of a rich auxiliary mixture into such precombustion chamber as a result of the use of nonuniform distribution of the composition of the working charge mixture in the main combustion chamber of the engine.

Further objects and advantages of the invention will become more readily apparent to persons skilled in the art from the following detailed description and annexed drawings, in which drawings:

FIG. 1 shows diagrammatically a precombustion chamber overhead-valve engine with a carburetor feed into cylinder and with local admission of a carburetted rich mixture into the cut off precombustion chamber zone.

FIG. 2 is a diagrammatic view showing the curves of the comoposition of the working mixture formed in the cylinder at the end of the suction stroke, vs. the composition of the mixture admitted into the cylinder from a carburetor cylinder section (or from a cylinder carburetor), and vs. the composition of the mixture admitted into the cylinder from the carburetor additional section (or from the additional carburetor).

Figure 9:
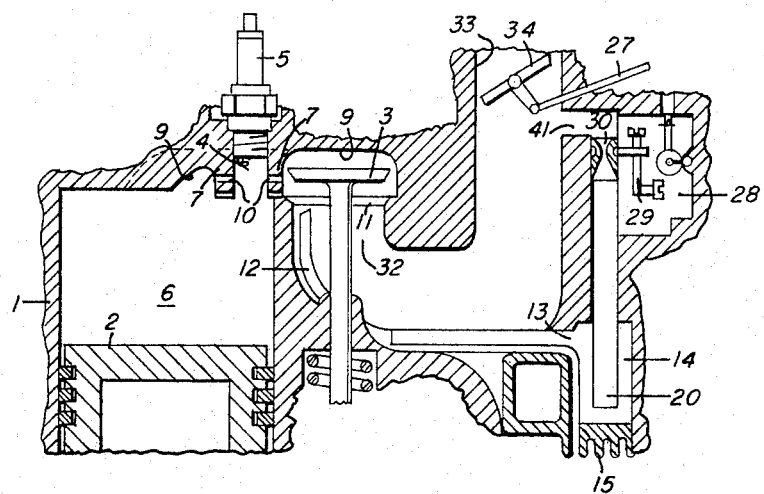

FIG. 9 shows diagrammatically a vertical sectional view of the construction of a precombustion chamber side-valve engine with an air feed into the cylinder, and with local admission of a carburetted rich mixture into the cylinder during the suction stroke in the vicinity of the precombustion chamber space that is cut off by the piston at the end of the compression stroke, and with an internal mixture formation of the working charge.

Figure 10:
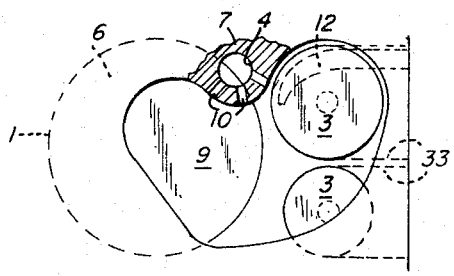

FIG. 10 shows diagrammatically a cross-section through a precombustion chamber side-valve engine with an air feed into the cylinder, and with local admission of a carburetted mixture through the cylinder inlet valve.

FIG. 11 shows diagrammatically a vertical sectional view of the construction of a precombustion chamber side-valve engine with an air feed into the cylinder and with direct fuel injection into the cylinder during the suction or compression stroke through the precombustion chamber space that is cut off by the piston at the end of the compression stroke and FIG. 12 shows diagrammaticaly a cross-section through a precombustion chamber engine with a direct fuel injection into the cylinder in the vicinity of the precombustion chamber space.

In all of these drawings, the position of the piston and of other parts of the engine during the suction stroke are shown in full lines, the position at the end of the compression stroke in dotted lines, when spark ignition and combustion of the auxiliary mixture takes place in the precombustion chamber, and jet ignition and combustion of the working mixture in the main combustion chamber.

Figure 1:
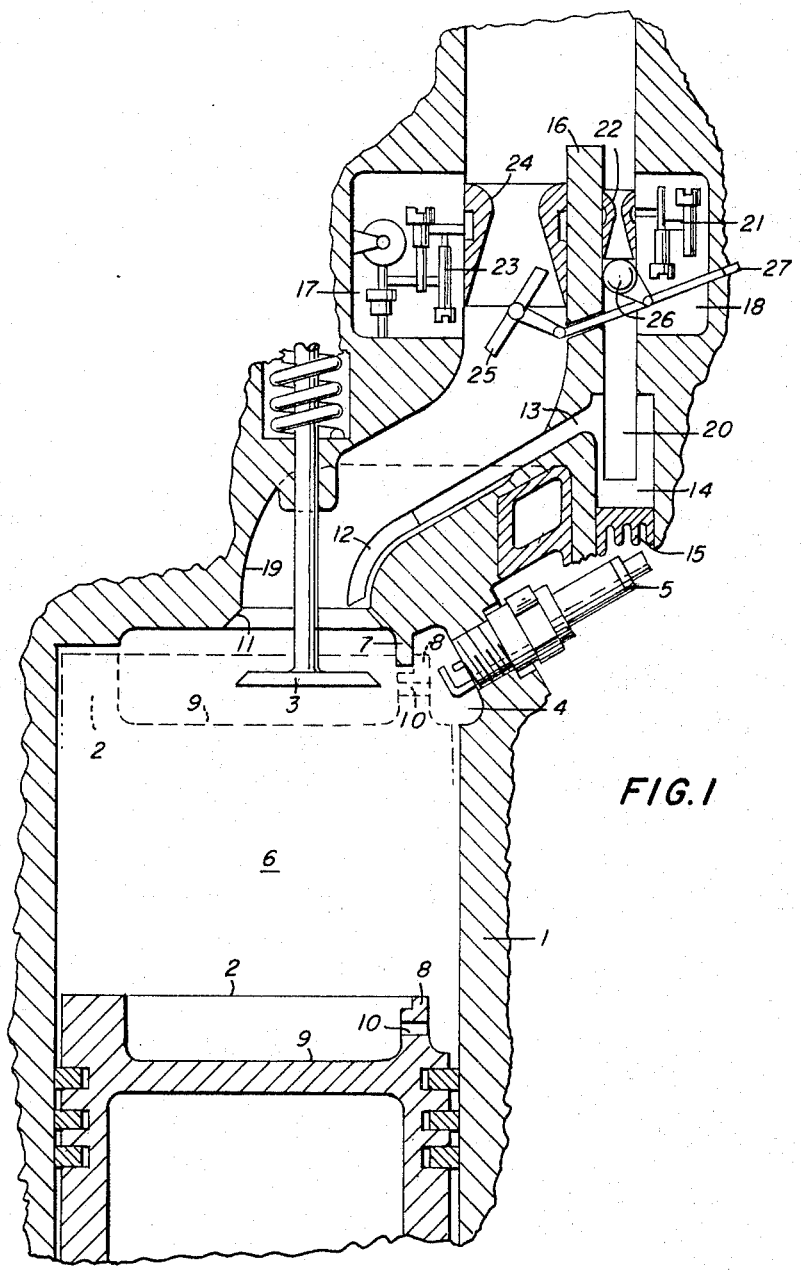

FIG. 1 shows a precombustion chamber engine with a carburetted feed into cylinder 1 of the working fuel-air mixture simultaneously with local admission therein of a rich auxiliary mixture. This is effected when piston 2 travels towards the bottom dead center and inlet valve 3 opens (see full lines) in the vicinity of a precombustion chamber space 4 that is cut off by the piston 2 at the end of the compression stroke when it approaches the top dead center (see the dotted-line position of the piston). The engine comprises the precombustion chamber space 4 formed between the space of spark plug 5 and space 6 of cylinder 1 and it is cut off from space 6 by a projection 7 of the cylinder head 1 and a projection 8 of piston 2, when the latter is in the vicinity of the top dead center. The projections on the cylinder head and the piston serve to cut off the precombustion chamber space 4 or increase the duration of the cut off period, and have a stepped, conical or any other shape. With piston 2 approaching the top dead center, these projections overlap each other, thus providing a stepped or conically shaped labyrinth lock, and cut off the precombustion chamber 4 from a main combustion chamber 9. Provided in one of these projections at a level of approximately the middle of the height of the main combustion chamber 9 and the precombustion chamber space 4, is an arrangement 10 with one or several passages at an angle with respect to each other, with such angle depending on the shape of the main combustion chamber, and the precombustion chamber space cut off by the piston thus communicating with the main combustion chamber through these passages. The passages of the arrangement 10 have a constant profile over the entire length, a small total area as referred to the volume of the precombustion chamber, i.e. approximately 0.03–0.04 cm.$^2$/cm.$^3$, a short length as referred to the conventional diameter of the passage, i.e. approximately 1–2, and a sharply defined shape of the inlet and outlet edges without any smooth rounding off.

The cut off precombustion chamber space 4 is located in the vicinity of the cylinder inlet valve 3 whose disc, during the suction stroke, descends approximately to the middle of the precombustion chamber space. The latter is below seat 11 of the inlet valve 3 at the point where above the seat of this valve is located the mouth of tip 12 of an enrichment passage or tube 13 through which local admission of rich fuel-air mixture into the cylinder 1 takes place. The enrichment passage 13 communicates with an evaporation well 14 fitted with heat-absorbing ribs 15 located in the vicinity of hot engine surfaces for preheating of the mixture.

Feeding of the precombustion chamber engine with fuel-air mixture is effected by a carburetor 16 consisting of a cylinder section (or of a separate cylinder carburetor) 17 for the preparation of the working mixture, and of an enrichment carburetor 18 for the preparation of the additional rich mixture. The working from the carburetor cylinder section 17 is admixed into the cylinder 1 space through a suction mixture duct 19 and through the inlet valve 3. The rich mixture from the carburetor enrichment section 18 is also admitted into the cylinder 1 space through the same inlet valve 3, but locally along the enrichment passage 13 from the evaporation well 14 having an inner tube 20.

Along this inner tube 20, the nonevaporated fluid film of the rich mixture drains into the evaporation well 14. For metering the fuel and regulating the composition of the mixture, the carburetor enrichment section 18 is fitted with a set of fuel and air nozzles 21 and a venturi 22. For metering and regulating the composition of the cylinder mixture, the cylinder section 17 of carburetor 16 is fitted with a set of fuel and air nozzles 23 and a venturi 24.

Regulation of the quantity of the cylinder mixture to suit the engine operating conditions, is effected by a throttle 25, and that of the quantity of the additional rich mixture by a throttle or cock 26. Operation of the two throttles is combined by means of a rod 27.

During he suction stroke when the piston descends to the bottom dead center and the projection 8 of piston 2 opens the precombustion chamber space 4, the inlet valve 3 opens and descends to the level of the middle of the height of the precombustion chamber space. A fresh charge of the working mixture is admitted through the inlet valve 3 into the space 6 of cylinder 1, scavenging the open precombustion chamber space 4 and the space of spark plug 5 to entrain the residual gases from the preceding cycle. The relative quantity of the cylinder mixture admitted through the inlet valve from the carburetor cylinder section (or from a separate cylinder carburetor) 17, constitutes the principal portion of the charge, i.e. over 95% of the total cylinder working charge. The quantity and composition of the mixture in the carburetor cylinder section varies depending on the engine load: on maximum loads with a full open throttle, maximum possible filling of the cylinder takes place with a mixture charge having an air-fuel ratio approximately $\alpha_1 = 1.15$, and with the load dropping down to idling, leaning out of the working mixture takes place down to $\alpha_1 = 2.4$ or more, accompanied by throttling of the cylinder mixture quantity down to the minimum valve. The relative quantity of the rich mixture, admitted from the carburetor enrichment section (or from a separate enrichment carburetor) 18, through the local feed enrichment passage 13, constitutes a small portion of the charge, i.e. less than 5% of the total cylinder working mixture charge.

Approximately one half of this rich mixture remains in the precombustion chamber space, while the other part of the mixture, together with the residual gases from the preceding cycle, is scavenged out of it into the cylinder and is there intermixed with the cylinder mixture thus further enriching it.

Formed in the cylinder at the end of the suction stroke, is a working mixture with an air-fuel ratio $\alpha'_1$, consisting of a mixture with an air-fuel ratio $\alpha_1$ admitted from the carburetor cylinder section (or from the separate cylinder carburetor) 17, with the quantity being approximately 95% of the total working charge volume, and of a rich mixture with an air-fuel ratio $\alpha_2$ admitted from the carburetor enrichment section (or from the separate enrichment carburetor) 18, the quantity being approximately 2–3% of the total working charge. This composition of the working charge mixture, provided intermixing is complete, can be found from the intermixing formula giving the mean concentration of fuel in air of the working charge:

$$C'_1 = (\Sigma V_i C_i / \Sigma V_i) = (V_1 C_1 + V'_2 C_2 / V_1 + V'_2)$$

where $C'_1 = 1/(\alpha'_1 L'_T)$; $L'_{T_1}$ is the theoretical quantity of air required for complete combustion of a weight or volume unit of fuel in the working charge mixture;

$$V_1 \cong 0.95 \Sigma V_1 = 0.95 V_1 + V_2) = 0.95$$

$V_h$ is the volume of the mixture that passed through the carburetor cylinder section (or through the separate cylinder carburetor); $V'_2 = V_2 - V_{pc}$ is the volume of the mixture that passed out of the carburetor enrichment section (or out of the separate enrichment carburetor) into the cylinder through the precombustion-chamber space, where:

$$V_2 \cong 0.05 \Sigma V_1 = 0.05(V_1 + V_2) = 0.05 V_h$$

while $V_{pc}$ is the volume of the precombustion chamber that is approximately 2–3% of the volume of the main combustion chamber, or on the average $$0.025 V_c = 0.025 V_h (1/\Sigma - 1)$$

this, with a compression ratio $\Sigma = 7.0$, would be $$(0.025/6) V_h = 0.004 V_h;$$

$V_h$ is the effective (working) cylinder volume.

$$C_1 = 1/(\alpha_1 L_{T_1}) \text{ and } C_2 = 1/(\alpha_2 L_{T_2})$$

are the concentrations of fuel in air in the mixture of the carburetor cylinder section and enrichment section respectively; $L_{T_1}$ and $L_{T_2}$ are theoretical quantities of air required for complete combustion of a weight or volume unit of fuel in the mixture of the carburetor cylinder section and enrichment section, respectively, in the case of feed therein with various kinds of fuel.

Substituting the values obtained, we have:

$$\frac{1}{\alpha'_1 L'_{T_1}} = \frac{V_1 C_1 + V'_2 C_2}{V_1 + V'_2} = \frac{0.95 V_h \cdot \frac{1}{\alpha_1 \alpha_{T_1}} + (0.05 V_h - 0.004 V_h) \frac{1}{\alpha_2 L_{T_2}}}{0.95 V_h + 0.05 V_h - 0.004 V_h}$$

Cancelling and taking into account that, when operating on identical fuel in the carburetor cylinder section and enrichment section, $$L'_{T_1} = L_{T_1} = L_{T_2} = L_T$$

we have:

$$\alpha'_1 = \frac{\alpha_1 \alpha_2}{0.953 \alpha_2 + 0.0462 \alpha_1}$$

Figure 2:
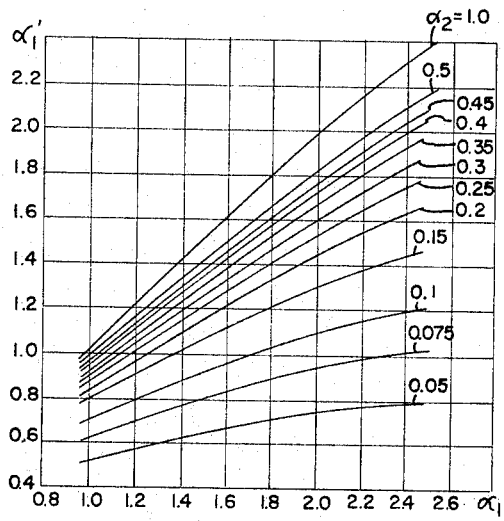

FIG. 2 shows the curves of the composition of the working mixture with $\alpha'_1$, vs. the composition of the mixture, admitted into the cylinder from the carburetor cylinder section (or from the cylinder carburetor), with $\alpha_1$, and vs. the composition of the mixture, admitted from the carburetor enrichment section (or from the enrichment carburetor), with $\alpha_2$. As can be seen from these curves, with the ratios of precombustion chamber volume/main combustion chamber volume set, and with the ratios of quantities of cylinder mixture/enrichment mixture also set, regulation of the composition of the working mixture with $\alpha'_1$ in the range from 0.9 to 1.85 can be effected in various ways:

(1) Set constant values $\alpha_2$ in the range from 0.3 to 1.0, vary $\alpha_1$ only in the range from 0.9 to 2.0–2.5;

(2) Set constant values $\alpha_1$ in the range from 1.5 to 2.0 and above, vary $\alpha_2$ only in the range from 0.075 to 1.0 and above;

(3) Vary simultaneously $\alpha_1$ and $\alpha_2$ in the above range of variation of $\alpha'_1$.

If for running on maximum loads we take $\alpha_1 = 1.15$ and $\alpha_2 = 0.2$, then $\alpha'_1 = 0.95$. If, on the other hand, for running on low loads and for idling we take $\alpha_1 = 2.4$ and $\alpha_2 = 0.2$, then $\alpha'_1 = 1.6$. Thus, provided complete intermixing takes place, the working charge mixture, at the end of the suction stroke, has a richer composition with an air-fuel ratio $\alpha'_1 = 0.95$ for running on maximum load, and $\alpha'_1 = 1.6$ for running on low loads and for idling, as compared with the composition of the mixture admitted from the carburetor cylinder section (or from the cylinder carburetor).

The precombustion chamber being formed as a pocket in the cylinder wall or in the cylinder head, the precombustion chamber space is to a large extent isolated from intensive turbulent movement of the working mixture in the cylinder during the suction stroke. Therefore, at the end of the suction stroke, the auxiliary mixture in the precombustion chamber would consist chiefly of the mixture having $\alpha_2$ that is admitted from the carburetor enrichment section (or from the enrichment carburetor) and would vary little with the speed and load of the engine.

During the compression stroke, intermixing of the cylinder mixture would be better, but the time for complete elimination of the nonuniform distribution of its composition over the volume of the chamber would be insufficient, especially with increasing engine speed. It may, therefore, be expected that in the main combustion chamber space, located in the vicinity of the precombustion chamber space, there would be a zone where the mixture is of richer composition.

Stratification of the charge in accordance with the composition of the mixture in the cylinder towards the end of the compression stroke will definitely take place. First, due to the constructional separation of the feed of the precombustion chamber space, by blowing in the vicinity thereof, of a very rich mixture with $\alpha_2=0.15$–$0.20$ to the amount of approximately 5%, and by admitting into the remainder cylinder volume of a considerably leaner mixture to the amount of approximately 95%. Secondly, because for complete intermixing of the charge consisting of a very lean mixture and a very rich mixture that is locally admitted in the vicinity of the precombustion chamber space, the duration of the compression stroke, that is $\varphi=100°$ of crankshaft angle, or $\tau=\varphi/6n=17$ milliseconds (msec.) at $n=1000$ r.p.m., would be absolutely inadequate.

Indeed, at first, intermixing of the charge during the suction stroke in the cylinder would be sufficiently intensive as the velocity of the air (or of the mixture) in the vicinity of the valve at the beginning of the suction stroke would reach about 200 m./sec. In this case, the rich mixture admitted from the passage whose mouth is located above the inlet valve seat in the vicinity of the precombustion chamber space can flow from one side of the main combustion chamber to the opposite side along a distance of for example, 100 mm., taking 0.5 msec., while the duration of the suction process would be 300° of the crankshaft angle, and at 1000 r.p.m., the duration would be 50 msec. This means that the duration of suction would be 100 times greater than the time required for intermixing.

However, such flow velocities occur only at the very beginning of the suction stroke, and only in the vicinity of the valve. As experimental studies of the flow of the charge in the engine have shown, the flow velocities of the charge in the cylinder during the compression stroke decrease 100 times, and, for instance, at 1000 r.p.m., in the vicinity of the walls of the main combustion chamber, the flow velocity of the charge is 1–3 m./sec. In this case, the rich mixture, admitted into the zone of the precombustion chamber space, to pass to the opposite wall of the main combustion chamber along a distance of 100 mm., would take about 50 msec., while the total duration of compression at the same engine speed would only be 17 msec. It is clear that this would be absolutely inadequate for the rich mixture to be distributed uniformly over the entire main combustion chamber.

With the engine speed increasing, the velocity of turbulent intermixing of the charge in the cylinder though also increasing, but to a still greater extent, decreases the duration of the compression stroke so that the time available for intermixing decreases, and the distribution of the mixture in the main combustion chamber remains nonuniform. Thus, the duration of the compression stroke is absolutely inadequate for complete intermixing of the mixture in the main combustion chamber, and that part of the rich mixture that is admitted into the cylinder at the end of the suction stroke has no time to flow uniformly over the entire charge of a working mixture, especially with the engine speed increasing.

Stratification of the working charge mixture in an engine with local admission of rich mixture into the zone of the precombustion chamber cylinder space would be approximately similar to that in an engine with direct fuel injection into the cylinder where, as is well known, the fuel has no time to distribute uniformly over the entire combustion chamber.

Of course, during the suction and compression strokes, fairly satisfactory intermixing of the major part of the mixture would take place in the cylinder. This must be reckoned upon and striven to not only for efficient use of the air and fuel, but also to ensure satisfactory relation between the composition of the mixture in the precombustion chamber with $\alpha_2$ and the composition of the mixture in the cylinder with $\alpha'_1$ as formed at the end of the suction stroke, in order to obtain a resulting composition of the auxiliary mixture in the precombustion chamber at the end of the compression stroke, at the instant of its ignition, with an air-fuel ratio $\alpha_{pc}=0.4$–$0.7$. However, for separation of the rich mixture to be admitted into the zone of the precombustion chamber space, and the formation of a leaner mixture in the cylinder, especially at its periphery at the present ratio of their quantities, as well as certain stratification of the working charge mixture in the main combustion chamber as experience shows, the conditions are quite adequate.

During the compression stroke, the composition of the mixture in the precombustion chamber space cut off by the piston would vary more by virtue of that into the precombustion chamber more cylinder mixture would be admitted, and the former mixture would become more lean down to the composition of the resulting mixture with $\alpha_{pc}$. We shall now calculate the resulting composition of the mixture in the precombustion chamber and deduce the relationship between it and the composition of the working mixture with $\alpha'_1$, also with the composition of the auxiliary rich mixture with $\alpha_2$.

If, at the beginning of the compression stroke, the auxiliary mixture with $\alpha_2$ occupied in the precombustion chamber the entire volume $V_{pc}$, then towards the end of the compression stroke it would be compressed $\epsilon$ times and would occupy a volume $V_2=V_{pc}/\epsilon$, where $\epsilon$ is the nominal compression ratio. The remaining volume of the precombustion chamber $$V_1 = V_{pc} - V_2 = V_{pc}\,(\epsilon-1/\epsilon)$$

would be occupied by a portion of the working mixture admitted into the precombustion chamber during the compression stroke.

The concentration of fuel in air of the auxiliary mixture admitted into the precombustion chamber during the suction stroke is $$C_2 = (G_{T_2}/G_{B_2}) = (1/\alpha_2 L_{T_2})$$

while the concentration of fuel in air of the working mixture admitted into the precombustion chamber during the compression stroke is $C'_1=(G_{T_1}/G'_{B_1})=(1/\alpha'_1 L'_{T_1})$. The mean concentration of fuel in air of the resulting precombustion-chamber mixture $$C_{pc} = (G_{T_{pc}}/G_{B_{pc}}) = (1/\alpha_{pc} L_{T_{pc}})$$

can be obtained from the intermixing formula $$C_{pc} = (\Sigma V_i C_i / \Sigma V_i)$$

Substituting the known values and taking into account that if identical fuels are used for the working and for the auxiliary mixtures $L_{T_{pc}}=L'_{T_1}=L_{T_2}=L_T$, we have $$C_{pc} = \frac{V_1 C_1 + V_2 C_2}{V_1+V_2} = \frac{V_{pc}\cdot\frac{\epsilon-1}{\epsilon}\cdot\frac{1}{\alpha'_1 L_T} + V_{pc}\cdot\frac{1}{\epsilon}\cdot\frac{1}{\alpha_2 L_T}}{V_{pc}\cdot\frac{\epsilon-1}{\epsilon} + V_{pc}\cdot\frac{1}{\epsilon}} =$$

$$\frac{\epsilon-1}{\epsilon}\cdot\frac{1}{\alpha'_1 L_T} + \frac{1}{\epsilon}\cdot\frac{1}{\alpha_2 L_T}$$

$$(1/\alpha_{pc}L_T) = (\epsilon-1/\epsilon)\cdot(1/\alpha_1 L_T) + (1/\epsilon)\cdot(1/\alpha_2 L_T)$$
$$(1/\alpha_{pc}) = (\epsilon-1/\epsilon)\cdot(1/\alpha'_1) + (1/\epsilon)\cdot(1/\alpha_2)$$

Hence:

$$\alpha_{pc} = \frac{\epsilon\,\alpha'_1 \alpha_2}{(\epsilon-1)\alpha_2 + \alpha'_1}$$

Thus, towards the end of the compression stroke, the air-fuel ratio of the working mixture in the cylinder would not vary, while the air-fuel ratio of the mixture in the cut-off precombustion chamber would be leaned out by the working mixture with $\alpha'_1$ from $\alpha_2$ to $\alpha_{pc}$ that is obtainable from the above formula. This formula does not yet take into account the actual compression ratio that is dependent upon the ignition advance angle. The actual compression ratio could be taken into account if the compression volume were known, and this latter is dependent upon the piston stroke-to-the-length of connecting rod ratio and the ignition advance angle $\beta$. However, as will be shown later, the effect is of no importance.

We shall now calculate the range of variation of the air-fuel ratio $\alpha_{pc}$ of the mixture in the precombustion chamber at the end of the compression stroke, with the air-fuel ratio $\alpha'_1$ of the cylinder mixture varying over the entire working range, e.g. from $\alpha'_1=0.95$ to $\alpha'_1=1.6$ with $\epsilon=7.0$.

For $\alpha'_1=0.95$ and $\alpha_2=0.2$:

$$\alpha_{pc} = \frac{7 \cdot 0.95 \cdot 0.2}{6 \cdot 0.2 + 0.95} = 0.62$$

For $\alpha'_1=1.6$ and $\alpha_2=0.2$:

$$\alpha_{pc} = \frac{7 \cdot 1.6 \cdot 0.2}{6 \cdot 0.2 + 1.6} = 0.80$$

If into account is taken the actual compression ratio vs. the ignition advance angle for maximum load operation, nothing would change, as under such conditions the ignition and efficient combustion of the working charge while the actual compression ratio equals the nominal value ($\epsilon_r=\epsilon_{nom.}$). With continuous economy operation on lean mixture, the ignition advance angle would appreciably increase up to 30° crankshaft angle or more, while the actual compression ratio would decrease down to $\epsilon_r=5.8$.

Then $\alpha_{pc}=(5.8 \cdot 1.6 \cdot 0.2)/(4.8 \cdot 0.2+1.6)=0.72$.

Thus, with the composition of the working mixture being regulated over the entire load variation range, the resulting composition of the auxiliary mixture in the precombustion chamber at the instant of ignition would always be within the optimum limits to ensure intensive ignition and efficient combustion of the working charge mixture.

The above formula establishes the regulation relationship between the compositions of the mixtures in the carburetor cylinder section ($\alpha'_1$) and in the carburetor enrichment section ($\alpha_2$); for this, we shall solve the above equation $1/\alpha_{pc}=(\epsilon-1/\epsilon) \cdot (1/\alpha'_1)+(1/\epsilon) \cdot (1/\alpha_2)$ to determine $\alpha_2$:

$1/\epsilon\alpha_2=(1/\alpha_{pc})-(\epsilon-1/\alpha'_1)$
$1/\alpha_2=(\epsilon\alpha'_1/\alpha_{pc}\alpha'_1)-(\alpha_{pc}(\epsilon-1))/(\alpha_{pc}\alpha'_1)$ whence:

$\alpha_2=\alpha'_1/(\epsilon\alpha_{pc} \cdot \alpha'_1-(\epsilon-1))$

Figure 3:
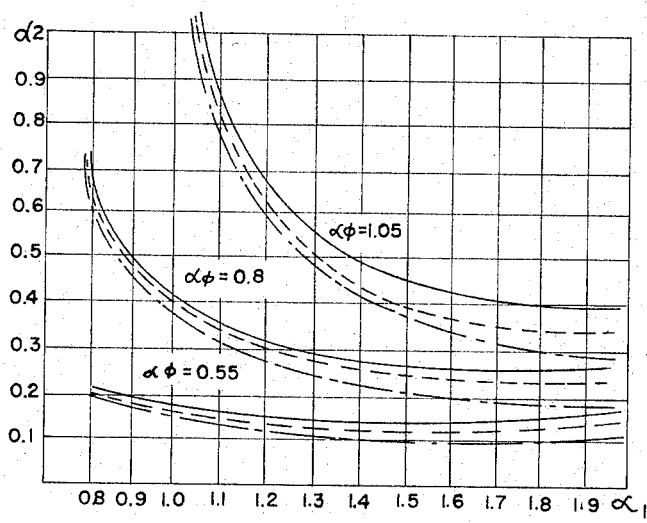
FIG. 3 is a diagrammatic view showing the curves of regulation of the composition in the carburetor additional section (or in the additional carburetor), vs. regulation of the composition of the working mixture in the cylinder.

The curves of this regulation formula are plotted in FIG. 3 for various values of the resulting composition of the auxiliary mixture in the precombustion chamber with $\alpha_{pc}=0.55$, 0.80 and 1.05, both without taking into account the variation of the actual compression ratio [full thin lines for $\epsilon=\epsilon_{nom.}=f(\beta)$], and taking into account the variation of the actual compression ratio vs. variation of the ignition advance angle [dotted thick lines for $\epsilon=\epsilon'_p=f(\beta)$]; also taking into account the considerable decrease of the actual compression ratio due to delayed end of suction stroke [full thick lines for $\epsilon=\epsilon_p=f(\beta)$]. As can be seen from these curves, taking into account the considerable decrease of the actual compression ratio due to compression volume decrease vs. ignition advance angle increase, or due to any other causes, is of no importance.

If in this regulation relationship we take the average value $\alpha_{pc}=0.8$ or leaner, this would lead, as experience shows, not only to low efficiency and great instability of operation of the precombustion chamber engine, but, as follows from the above curves, also to very sharp mutual regulation of the compositions of the mixtures in carburetor cylinder section and in the carburetor enrichment section. In the precombustion chamber engine feed regulation system proposed by our invention, the mean value $\alpha_{pc}=0.55$ is taken. This not only ensures highly efficient and stable operation of the engine, but also perfectly smooth regulation of the rich mixture in the carburetor enrichment section, or in the separate enrichment mixture carburetor on a constant level with $\alpha_2$ from 0.1 to 0.2, irrespective of the composition of the mixture in the carburetor cylinder section or in the separate cylinder mixture carburetor.

This system of feed regulation in a precombustion chamber engine with the precombustion chamber space cut off by the piston is similar to the system of feed regulation in a precombustion chamber engine with a permanently separated precombustion chamber volume, the difference being of a purely constructional nature, consisting in that the precombustion chamber is cut off by the piston and that the feed of the precombustion chamber is valveless.

During ignition and combustion of the rich mixture in the precombustion chamber, the piston 2 would be in the vicinity of the top dead center. Travel of the piston over 2–3 mm. (this corresponding to ±25–30° crankshaft angle) relative the top dead center does not open the precombustion chamber as the space 4 of the latter is shut off by the projection 8 of the piston 2 and the projection 7 of the cylinder head. The precombustion chamber is adequately isolated from the main combustion chamber 9 and from the working charge with intensive turbulent movement prevailing in the latter. Therefore, efficient scavenging of the precombustion-chamber space and the spark plug space after the preceding cycle during the suction stroke and elimination of the excessively intensive turbulence in the cut off combustion chamber, as proposed by the invention, and as proven by experiments, ensure normal combustion of the rich, slowly burning auxiliary mixture. This is promoted also by the fact that the rich mixture admitted from the enrichment section 18 of the carburetor 16 is intensely preheated in the evaporating well 14 through the heat-absorbing ribs 15 located in the vicinity of the exhaust manifold, oil cooler, or other hot surfaces of the engine. Such preheating cannot cause detonation in the working charge mixture as the mixture that is being preheated is of very rich composition and its quantity is very small, while the mixture from the cylinder section 17 of the carburetor 16 is admitted into the cylinder 1 without intensive preheating.

After a short period following the ignition and the beginning of the spreading of the flame front out of the precombustion chamber starts the flow of combustion products through the intercommunication arrangement 10 with the passages through which the precombustion chamber 9 communicates. In flowing out of the small area sharply defined precombustion chamber passages, the flame breaks up and goes out, and, instead of a jetlike flame, a jet of active products of incomplete combustion of the rich auxiliary mixture starts. With the turbulent breaking up of the precombustion chamber jet, turbulization of the working charge mixture takes place, as well as a swirl formation of a multitude of small size centers. In these centers, ramified chemical chain reactions develop, initiated by the active products of the precombustion-chamber jet, and as a result, intensive ignition is realized, together with rapid and efficient combustion of the working mixture within wide limits of variation of its composition.

On completion of the process of combustion, expansion of the working body begins. Piston 2 descends to the bottom dead center, and as a result, the precombustion chamber space 4 is opened, and becomes integral with the main combustion chamber 9 and space 6 of cylinder 1.

The working process cycle in the proposed precombustion chamber engine then continues as in the usual two-stroke or four-stroke type internal combustion engines.

Figure 4:
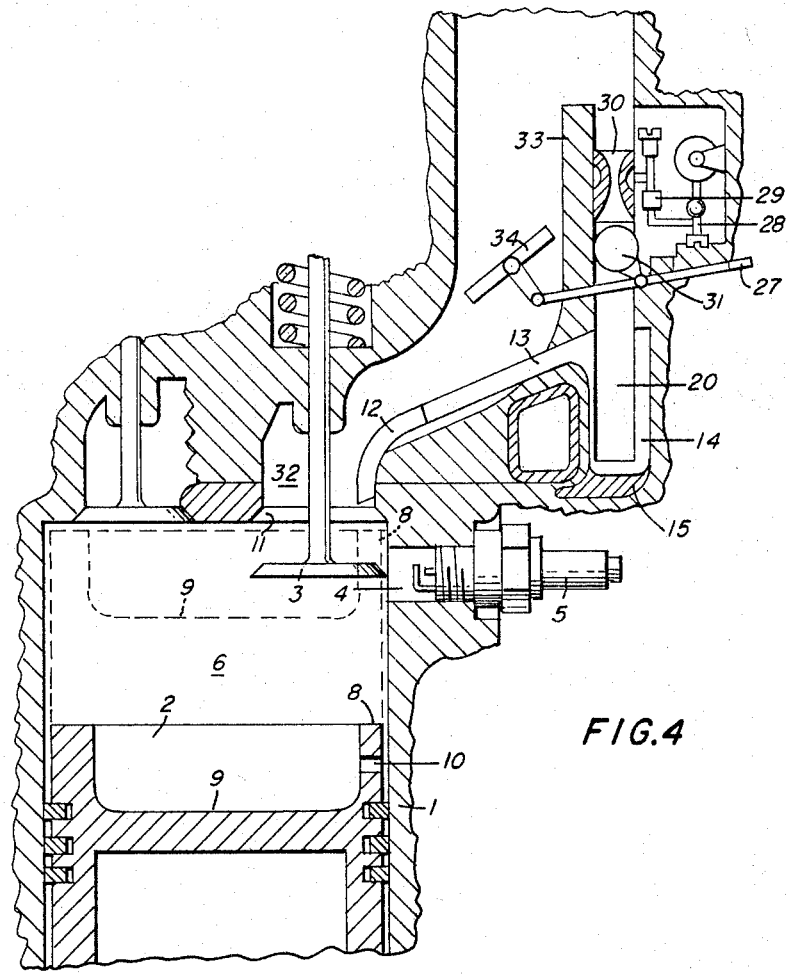
FIG. 4 shows diagrammatically a vertical sectional view of a precombustion chamber overhead-valve engine with an air feed to the cylinder and with a local admission of a carburetted rich mixture into the cut off precombustion chamber zone, with a subsequent internal mixture formation of the working charge in the cylinder.

FIG. 4 shows diagrammatically a procombustion chamber engine with an air feed of the cylinder with local admission of rich mixture, and with internal mixture formation. With such construction of the engine, the cylinder 1 is fed with air, and locally a separate fuel-air rich mixture is admitted during the suction stroke (see full lines), when the piston 2 descends to the bottom dead center and the inlet valve 3 opens. This arrangement consists of a precombustion chamber space 4 formed (similarly to the arrangement described in FIG. 1) between the space of sparkplug 5 and the space 6 of cylinder 1, with the precombustion chamber volume being cut off from the latter by the projection 8 of piston 2 when the latter is approaching the top dead center (see dotted lines).

At the place of of the piston 2, projection 8 which cuts off the precombustion chamber space 4 on the level of approximately half the height of the main combustion chamber 9 and the precombustion chamber space 4 is provided with intercommunication arrangement 10, where at an angle with respect to each other, with such angle depending on the shape of the main combustion chamber, are located several precombustion chamber passages (see FIG. 5), or only one such passage, and the total area of all such passages, referred to the precombustion chamber volume, have an optimum value for efficient combustion, approximately 0.03–0.04 cm.$^2$/cm.$^3$. The passages are arranged in a plane approximately at right angles to the center line of the cylinder.

The shape of the precombustion chamber passages is sharply defined without rounded-off edges of a constant profile over the entire length. The length of the passages, referred to as their conventional diameter, should be approximately 1–2.

The space 4 is located in the vicinity of inlet valve 3 whose disc, during the suction stroke, descends to the middle of the precombustion chamber space. The latter is below the seat 11 of the inlet valve 3 at the point while above the seat is located the mouth of tip 12 of the enrichment passage 13 in the form of a drilled hole or of a tube through which the rich fuel-air mixture is admitted into the cylinder. This enrichment passage 13 communicates with the enrichment carburetor 28 through the evaporation well 14 fitted with heat-absorbing ribs 15 for preheating of the rich mixture, and also fitted with an inner tube 20 along which any fuel poorly evaporated in the enrichment carburetor 28 drains into the evaporation well 14 in the form of a fluid film. The enrichment carburetor 28 used for the preparation of the rich mixture, is fitted with a set of fuel and air nozzles 29, a venturi 30, and a throttle or throttle cock 31.

Clean air from air pipe connection piece 33 fitted with a throttle 34 is admitted through the inlet valve 3, and inlet passage of air duct 32 during the suction stroke.

The quantities of clean air and rich mixture simultaneously admitted into the cylinder through the inlet valve are regulated by the combined control of throttle 34 in the air pipe connection piece 33, and of enrichment carburetor 28, throttle or throttle cock 31 by means of rod 27.

During the suction stroke when the piston 2 descends to the bottom dead center and the precombustion chamber space 4 is opened, the inlet valve 3 opens and descends to the level of half the height of the precombustion chamber space. A fresh working charge flows into the cylinder 1, and at the same time scavenges the precombustion chamber 4 and the spark plug 5 space. The quantity of clean air ($\alpha_1 = -\infty$) admitted through the inlet valve 3 from the air pipe connection piece 33 constitutes the principal part of the charge, approximately 90% of the total charge. The quantity of rich mixture ($\alpha_2 = 0.1$–$0.2$) admitted into the cylinder 1 from the enrichment carburetor 28 through the enrichment passage 13 amounts to about 10% of the total charge. A very small part (2–3% of $V_c$) of the mixture blown through the precombustion chamber space 4 remains in the precombustion chamber.

At the end of the suction stroke, the cylinder working charge mixture with $\alpha'_1$ would consist of pure air ($\alpha_1 = \infty$) to the amount of approximately $V_1 = 90\%$ of the total working charge volume, and a rich mixture ($\alpha_2 = 0.1$–$0.2$) to the amount of approximately $V_2 = 10\%$ of the total working charge volume, less the mixture volume $V_{pc}$ that remained in the precombustion chamber. The composition of the cylinder working mixture with $\alpha'_1$, provided intermixing is complete, can be found by means of the intermixing formula giving the mean concentration of fuel in air of the working charge:

$$C'_1 = (\Sigma V_i C_i / \Sigma V_i) = (V_1 C_1 + V'_2 C_2 / V_1 + V_2)$$

where $C'_1 = (1/\alpha_1 L_{T1})$.

$L'_1$ is the theoretical quantity of air required for the combustion of a weight or volume unit of fuel in the given mixture;

$V_1 \cong 0.9 \Sigma V_i = 0.9(V_1 + V'_2) = 0.9 V_h$ is the volume of air that passed through the throttle 34 of the air pipe connection piece 33;

$V_2 \cong 0.1 \Sigma V_1 = 0.1(V_1 + V'_2) = 0.1 V_h; V'_2 = V_2 - V_{pc}$ where:

$V_2$ is the volume of the mixture admitted into the cylinder 1 from the enrichment carburetor 28 through the precombustion chamber space 4;

$V_{pc}$ is the volume of the precombustion chamber, approximately equal to 2% from $V_c$ or $0.02 \cdot (V_h/\epsilon - 1)$; for $\epsilon = 7 V_{pc} = (0.02/6) \cdot V_h \cong 0.003 V_h$; $C_1 = (1/\alpha_1 \cdot L_{T1})$, which for pure air equals 0; $C_2 = (1/\alpha_2 \cdot L_{T2})$ is the concentration of fuel in air of the mixture admitted from the enrichment carburetor, with this concentration varying in the range from $1/(0.1 \cdot L_{T2})$ to $1/(0.2 \cdot L_{T2})$. Substituting, we have:

$$1/(\alpha'_1 L'_{T1}) = (V'_2 C_2)/(V_1 + V_2) =$$
$$(V_2 - V_{pc})/(\alpha_2 L_{T2}(V_1 + V_2 - V_{pc}))$$

Taking into account that $L'_{T1} = L_{T2} = L_{T1} = L_T$, we have:

$$\alpha'_1 = (1 + (V_1/V_2 - V_{pc})) \alpha_2$$

If at all conditions of operation of the engine, with combined throttling of the air and mixture, the ratio $$V_1/(V_2 - V_{pc})$$

is maintained approximately invariable, and $$V_1 = 0.9 V_h, V_2 = 0.1 V_h, V_{pc} = 0.003 V_h$$

are used, then:

$$\alpha'_1 = \alpha_2(1 + (0.9/0.1 - 0.003)) = 10.3 \alpha_2$$

Thus, provided intermixing is ensured, the cylinder mixture with $\alpha'_1$ at the end of the suction stroke would be 10.3 times leaner than the mixture admitted from the enrichment carburetor.

Figure 6:
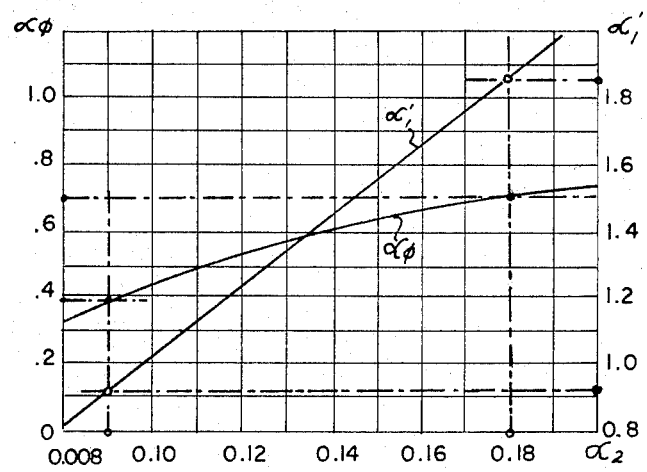
FIG. 6 is a diagrammatic view showing the curves of the composition of the working mixture in the cylinder, and the composition of the auxiliary mixture in the precombustion chamber, vs. the composition of the mixture admitted from the carburetor.

FIG. 6 shows the curve of the working charge mixture air-fuel ratio $\alpha'_1$ vs. the enrichment carburetor mixture air-fuel ratio $\alpha_2$, plotted for the given relation between the values of $V_1$, $V_2$ and $V_{pc}$. As can be seen from this curve, if $\alpha_2 = 0.09$, then $\alpha'_1 = 10.3 \cdot 0.09 = 0.93$ for maximum load operation.

If $\alpha_2 = 0.18$, then $\alpha'_1 = 10.3 \cdot 0.18 = 1.85$ for low load operation.

Therefore, variation of the enrichment carburetor mixture air-fuel ratio in the range from $\alpha_2 = 0.09$ to $\alpha_2 = 0.18$, i.e., doubling, causes the cylinder mixture air-fuel ratio to vary from $\alpha'_1 = 0.93$ to $\alpha'_1 = 1.85$ over the entire range of operational conditions.

As the end of the suction stroke, the auxiliary mixture in the precombustion-chamber space 4 would have a composition with $\alpha_2$, and would vary little with the engine speed or load as it is substantially isolated from the cylinder 1.

During the compression stroke, more efficient intermixing of the cylinder mixture would take place. However, time for the elimination of the non-uniformity in its spreading over the entire volume of the main combustion chamber, as shown above, would not be sufficient especially with the engine speed rising. It can, therefore, be expected that in the main combustion chamber space adjacent to the precombustion chamber, there would be a zone with a mixture of richer composition while at the remote parts of the main combustion chamber, mixtures of leaner compositions would prevail.

During the compression stroke, the composition of the mixture in the cut off precombustion chamber space would vary, due to the fact that more and more cylinder mixture would penetrate into the precombustion chamber to lean out the mixture therein.

At the end of the compression stroke, the composition of the working mixture would not vary, while the composition of the mixture in the cut off precombustion chamber would be leaned out by the working mixture with $\alpha'_1$ from a composition with $\alpha_2$ to a composition with $\alpha_{pc}$, with this latter being obtainable from the formula deduced above:

$$\alpha_{pc} = (\epsilon \alpha'_1 \alpha_2) / ((\epsilon - 1)\alpha_2 + \alpha'_1)$$

This formula does not yet take into account the actual compression ratio that is dependent upon the ignition advance angle. The actual compression ratio could be taken into account if the compression volume were known, with this latter being dependent upon the piston stroke to the length of the connecting rod ratio and the ignition advance angle $\beta$. However, as shown above, the effect is of no importance.

We shall now calculate the range of variation of the air-fuel ratio $\alpha_{pc}$ of the mixture in the precombustion chamber at the end of the compression stroke, with the air-fuel ratio of the cylinder mixture varying over the entire working range, with $\epsilon = 7.0$.

For $\alpha'_1 = 0.93$ and $\alpha_2 = 0.09$:

$$\alpha_{pc} = (7 \cdot 0.93 \cdot 0.09)/(6 \cdot 0.09 + 0.93) = 0.4$$

For $\alpha'_1 = 1.85$ and $\alpha_2 = 0.18$:

$$\alpha_{pc} = (7 \cdot 1.85 \cdot 0.18)/(6 \cdot 0.18 + 1.85) = 0.8$$

If the actual compression ratio vs. the ignition advance angle for maximum load operation is taken into account, nothing would change as under such conditions the ignition advance angle is minimum and approaches zero, while the actual compression ratio equals the nominal value ($\epsilon = \epsilon_{nom.} = 7.0$). With continuous economical operation on a lean mixture, the ignition advance angle would appreciably increase (up to $\beta = 30°$ crankshaft angle), while the actual compression ratio would decrease to $\epsilon_r = 5.8$.

Then $\alpha_{pc} = (5.8 \cdot 1.85 \cdot 0.18)/(4.8 \cdot 0.18 + 1.85) = 0.71$.

This mixture composition with $\alpha_{pc} = 0.71$ is better than that with $\alpha_{pc} = 0.8$ as it is further away from the limit of steady and efficient operation of a precombustion-chamber engine. Throttling the ports through which the precombustion chamber cut-off by the piston communicates with the main combustion chamber, need not be taken into account as it is done in the case of precombustion chamber systems with a permanent precombustion chamber, since in the precombustion chamber system under examination no pressure differential of any significance is possible between the main combustion chamber and the precombustion chamber towards the end of the compression stroke.

FIG. 6 shows the results of calculation of $\alpha_{pc}$.

Thus, over the entire range of variation of the working mixture air-fuel ratio from $\alpha'_1 = 0.93$ to $\alpha'_1 = 1.85$, obtained with the regulation of the enrichment carburetor mixture composition from $\alpha_2 = 0.09$ to $\alpha_2 = 0.18$, and the composition of the auxiliary mixture in the precombustion chamber at the instant of ignition is within the most favorable range $\alpha_{pc} = 0.4 - 0.7$ for intensive ignition and efficient combustion of the working mixture.

During ignition and combustion of the rich mixture in the precombustion chamber, the piston 2 would be in the vicinity of the top dead center. Travel of the piston over the 2-3 mm. (this corresponding to ±25-30° crankshaft angle) relative to the top dead center does not open the precombustion chamber space 4 due to the system of shutting off which is provided. The precombustion chamber space is adequately isolated from the main combustion chamber 9 and from the working charge intensive turbulent movement prevailing in the latter. Therefore, efficient scavenging of the precombustion chamber space 4, the sparkplug 5 space and restriction of excessively intensive turbulence ensure, in the present constructional arrangement by normal combustion of the rich, slowly burning auxiliary mixture in the precombustion chamber. This is promoted also by the fact that the mixture admitted from the enrichment carburetor 28 is intensively preheated in the evaporation well 13, and enrichment passage 13 which are both located in the vicinity of hot surfaces of the engine. Such preheating cannot cause detonation as the mixture that is being preheated is of very rich composition and its quantity is not great, while the air of the main is admitted into the cylinder without preheating.

Thereafter follows the process of jet ignition and combustion as well as the working process which proceed along the lines described above.

Figure 7:
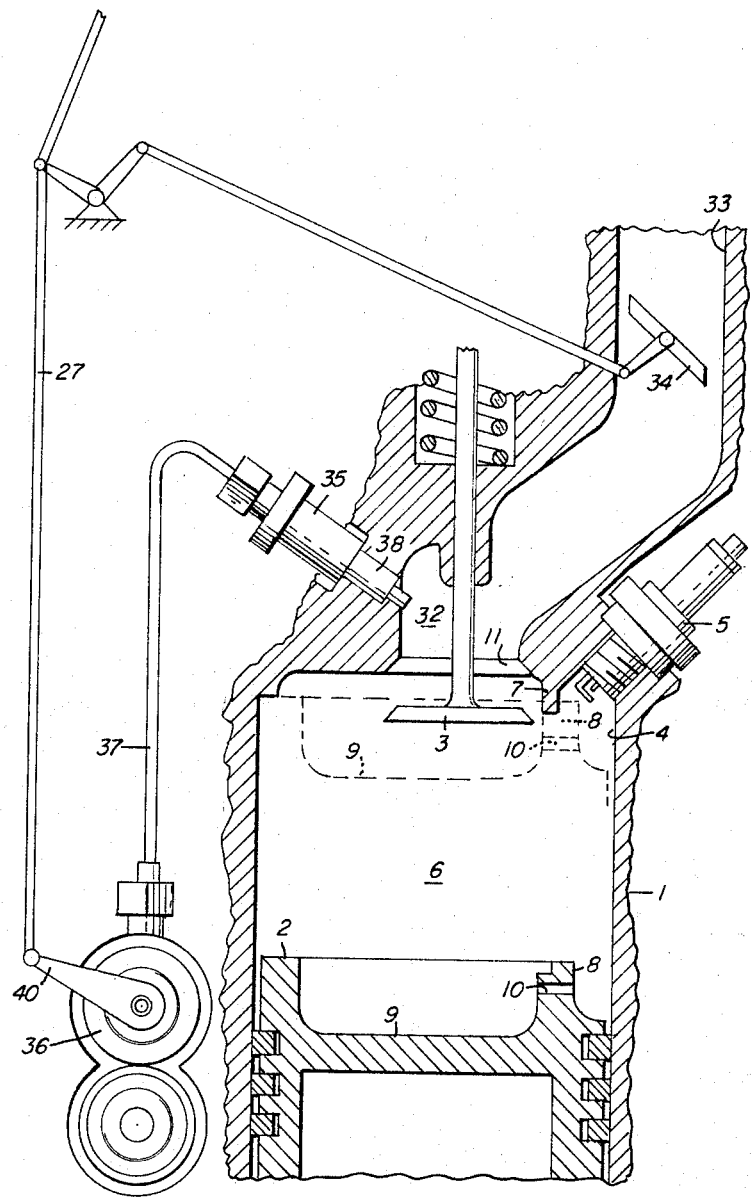
FIG. 7 shows diagrammatically a precombustion chamber overhead-valve engine with an air feed into the cylinder, and with simultaneous injection of fuel through the air duct during the suction stroke into the cylinder in the direction towards the precombustion chamber space.

FIG. 7 shows diagrammatically a precombustion chamber engine with an air feed of the cylinder and with simultaneous admission of fuel therein through the suction air duct during the suction stroke. In this design, precombustion chamber-jet ignition is applied to an overhead-valve engine, where air is admitted into cylinder 1 during the suction stroke when piston 2 travels towards the bottom dead center and when inlet valve 3 opens (see full lines), while the fluid fuel is injected into cylinder 1 through the suction air duct 32 in a direction towards the precombustion chamber space 4 located in the wall of cylinder 1 in the vicinity of the sparkplug 5. The precombustion chamber space 4 is cut-off from the space 6 of cylinder 1 by projection 7 of the cylinder head and by the projection 8 on piston 2, when the latter approaches the top dead center (see dotted lines). The projections of the cylinder head and piston 2 are stepped, conical or of any other shape. The precombustion chamber space 4 is arranged in the vicinity of the inlet valve 3 whose disc descends, during the suction stroke, below the level of the projection 7 of the cylinder head. The volume of the space 4 is 2-3% of the volume of the main combustion chamber 9. For the space 4 to be dependably isolated from the main combustion chamber 9, the projection 7 and the projection 8 overlap each other about 2-3 mm., and constitute a labyrinth lock of stepped or conical shape. This is maintained during ±25-30° of crankshaft angle, while the piston 2 travels in the vicinity of the top dead center.

The space 4 communicates with the main combustion chamber 9 through an arrangement 10 having one or several passages drilled in one of the projections, or passages cut in in the slit between the projections of the piston and the cylinder head. The optimum total area of the passages, referred to as the volume of the precombustion chamber, required to ensure highest efficiency of the process of jet ignition and combustion is approximately 0.03-0.04 cm.$^2$ per cm.$^3$ of the precombustion chamber volume. The shape of the drilled passages or slit passages must be sharply defined without rounded-off edges. The ratio of the length of the passages to their conventional diameter is approximately 1-2. The passages are arranged in a plane approximately at right angles to the cylinder center line at an angle with respect to each other depending on the shape of the main combustion chamber.

The fuel injector 35 is arranged on the engine so that spray nozzle 38 injects the fuel into the mouth of air duct 32 in a direction towards the space 4. Fuel to the injector 35 is delivered through tube 37 by pump 36 with a feed distributor and regulator whose lever is linked to the rod 27 of the combined control.

Air is delivered to the inlet valve 3 through air duct 32 from the air pipe connection piece 33 fitted with throttle 34. Regulation of the quantity of fuel injected is effected by the regulator of fuel pump 36 by means of a lever linked, through the combined control rod 27, to the lever of the throttle 34 for regulating the quantity of air admitted into cylinder 1 through air pipe connection piece 33.

During the suction stroke when piston 2 travels towards the bottom dead center, the precombustion chamber space 4 opens. The inlet valve 3 then opens and descends somewhat below the projection 7 and scavenges the space 4 and the space of the sparkplug 5 after the preceding cycle filling the space 4 and space 6 with a fresh charge, with the fuel being injected into the air stream of the latter. Efficient mixture-formation of the fuel injected during the suction stroke is promoted by the increased velocity of the turbulent flow of air through the mouth of air duct 32 and increased the duration of the mixture preparation in space 6 of the cylinder 1. However, as the fuel is injected locally in the direction towards the space 4 and as injection continues during the suction stroke and a portion of the compression stroke, the working charge mixture would have no time to spread uniformly over the space 6 and at the end of the compression stroke, it would remain more enriched in the zone of the space 4 and more leaned-out at the remote parts of the main combustion chamber 9.

The rich mixture, with an air-fuel ratio of approximately $\alpha_{pc}=0.4$–$0.7$, whose composition is present by the design in choosing the direction of the spray nozzle of the injector 38 and the location of the space 4, is cut off in the latter when the piston 2 approaches the top dead center and is ignited with a certain advance by the spark plug 5. As the space 4 is in the form of a pocket in the wall of the cylinder 1 and is quite dependably cut off from the main combustion chamber 9 by the projection 7 and projection 8, it is efficiently isolated from the intense turbulence prevailing in the main combustion chamber 9. Efficient scavenging of the space 4 and the removal of residual gases, together with the absence of intense movement of the auxiliary mixture therein promote efficient spark ignition and a sufficiently rapid combustion of the rich mixture. As a result of the pressure in the precombustion chamber space 4 rising out of the latter through the arrangement 10 having one or several precombustion chamber holes, jets of chemically active products obtained from incomplete combustion of the rich mixture are ejected, with such products creating a multitude of small centers of mixture in the working charge in the main combustion chamber 9. The precombustion chamber jets add into these centers the chemically active products obtained from the incomplete combustion of the rich mixture which are ejected from the precombustion chamber, and thus initiate therein ramified chemical chain reactions. This leads to intensive ignition and rapid combustion of the working charge mixture. This takes place not only when operating with rich mixtures on maximum loads, but also, and especially when operating with lean mixtures on low loads and when idling.

On completion of the process of combustion of the working charge, the gases expand and actuated by their pressure, the piston travels towards the bottom dead center. The precombustion chamber space 4 then opens and combines with the space 6 to constitute one common combustion chamber.

Thereafter the working process continues as in other internal combustion engines.

Figure 8:
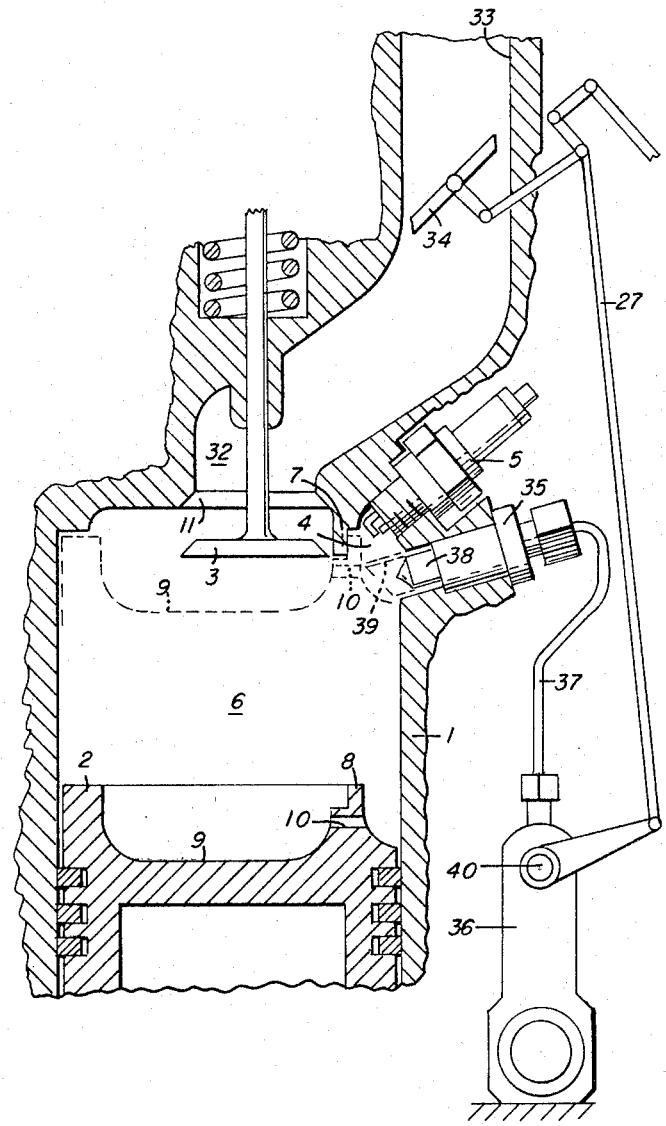
FIG. 8 shows diagrammatically a precombustion chamber overhead-valve engine with an air fed into the cylinder, and with direct fuel injection into the cylinder during the suction stroke, or during the compression stroke, through the open precombustion chamber space that is cut off by the piston at the end of the compression stroke.

FIG. 8 shows diagrammatically the arrangement for an air feed of the cylinder with local admission of fuel into the engine cylinder by direct injection. In this embodiment, precombustion chamber-jet ignition is applied to an internal combustion engine where into the cylinder 1, during the suction stroke when the piston travels towards the bottom dead center and when the inlet valve 3 opens (see dotted lines), air is admitted while the fluid fuel is injected into the cylinder 1 through the open precombustion chamber space 4 during the suction stroke or the compression stroke by means of the injector 35. This engine consists of the precombustion chamber space 4 located in the wall or head of cylinder 1 between the space of the spark plug 5 and space 6 of cylinder 1. The space 4 is cut off from the space 6 by the projection 8 on piston 2 and by the projection 7 on the head of cylinder 1 when the piston is in the vicinity of the top dead center (see dotted lines). The projections on the cylinder head and piston are of a stepped, conical or any other shape. The space 4 is located close to the inlet valve 3, whose disc descends during the suction stroke below the projection 7. The volume of the precombustion chamber space 4 cut off by the piston is 2–3% of the volume of the main combustion chamber 9. For the space 4 to be dependably isolated from the main combustion chamber 9, the projection 7 and the projection 8 overlap each other 2–3 mm., thereby constituting a labyrinth lock of stepped or conical shape. This is maintained during ±25–30° of the crankshaft angle, while the piston 2 travels in the vicinity of the top dead center.

The space 4 communicates with the main combustion chamber 9 through an arrangement 10 having one or several passages drilled in one of the projections, or passages cut in the slit between the projections of the piston and the cylinder head. The optimum total area of the passages, referred to as the volume of the precombustion chamber, required to ensure highest efficiency of the process or jet ignition and combustion is approximately 0.03–0.04 cm.$^2$ per cm.$^3$ of the precombustion chamber volume. The shape of the drilled or slit passages must be sharply defined without rounded-off edges. The ratio of the length of the passages to their conventional diameter is approximately 1–2. The passages are arranged in a plane approximately at right angles with respect to the cylinder center line at an angle with respect to each other, depending on the shape of the main combustion chamber.

Arranged together with the spark plug 5 in the precombustion chamber space, is the injector 35, with fuel being fed thereto by pump 36 having a fuel feed regulator through tube 37. The spray nozzle 38 of injector 35 has two fuel passages arranged in the plane of the center lines of injector 35 and cylinder 1, with the center lines of the fuel passages meeting at an angle with respect to each other to ensure that the point of intersection is located inside the cut off precombustion chamber space. Installed beyond the spray nozzle 38 is a tip 39 of fireproof material having fine holes on the surface, and this tip serves to restrict penetration of the fluid fuel drops into the spark plug space of the precombustion chamber for improving evaporation of the fuel and intermixing of the same with the air admitted into the space 4 that is cut off by the projection 7 and the projection 8 at the end of the compression stroke. For this, the tip 39 must project into the space 4 and be located above the fuel jet.

The air is supplied to the inlet valve 3 from the air pipe connection piece 33 fitted with a throttle 34 through the air duct 32.

Regulation of the quantity of fuel to be injected is effected by rack 40 of pump 36, with the rack being linked by means of rod 27 to the lever of the throttle 34 regulating the supply of air through the air pipe connection piece 33 into the cylinder 1. During the suction stroke when the piston 2 descends and travels towards the bottom dead center, the space 4 opens. At this time, the inlet valve 3 opens and descending somewhat below the projection 7, it scavenges with clean air the space 4 and the space of the spark plug 5 to evacuate the residual gases from the preceding cycle thus filling the cylinder 1 with a fresh air charge. Then, during the compression stroke, the piston 2 starts its travel towards the top dead center, compressing the air and raising its temperature. During the suction or compression stroke, fuel injection into the cylinder 1 starts under the pressure developed by the fuel pump. Two jets of fuel from the spray nozzle 38 are directed to meet each other in the plane of the center lines of the injector 35 and cylinder 1, and on meeting, they pulverize the fuel thus forming in the cylinder a flat fuel jet, whose plane is at a certain angle with respect to the center line of the cylinder, and spreads over a greater or smaller area of the cylinder depending on the conditions of operation of the engine and thus, on the rate of fuel feed and the range of action of the nozzle. With fuel injection during the compression stroke, the end of the fuel injection takes place at the instant when the piston 2 approaches the top dead center, and when the projection 8 overlapping the projection 7 begins to cut off the space 4 and therein the last portion of the fuel being injected.

Owing to the fact that at the point of meeting of the two fuel jets that is located inside the precombustion chamber space, a small cloud of mistlike fuel is formed, the precombustion chamber space is fed with a fuel-air mixture that is well pulverized, irrespective of the quantity of fuel admitted into the cylinder and the composition of the working charge mixture. The necessary quantity of fuel remaining in the precombustion chamber space to constitute the auxiliary precombustion chamber mixture must ensure the formation of a rich mixture with an air-fuel ratio within $\alpha_{pc}=0.4$–$0.7$. This is achieved by the selection of the angle between the fuel jets and of a greater and smaller distance between the injector and the point of meeting of the jets in the cut off precombustion chamber space. This is necessary to ensure a precombustion chamber jet of incomplete combustion chemically active products to obtain a highly efficient process of jet ignition and combustion.

The quantity and composition of the working charge mixture are mutually adjustable by adjusting the quantities of air and fuel so that when operating on maximum loads, the cylinder is filled to the maximum extent with air and admitting fuel therein to form a mixture composition with an air-fuel ratio approximately $\alpha=0.95$. Power reduction is effected by reducing the admission of air into the cylinder by partially closing the throttle in the air pipe connection piece so that for operation on low loads and idling, the quantity of air is reduced to a minimum, and reducing the quantity of fuel at the same time to lean-out the working mixture to $\alpha=1.6$ and more.

With a certain advance, before the top dead center, spark ignition of the auxiliary fuel-air rich mixture is effected in the precombustion chamber. Although the auxiliary fuel-air mixture in the precombustion chamber is of a very rich composition, ignition and combustion is dependable and rapid due to the fact that the residual gases have been scavenged from the precombustion chamber and that there is no excessive concentration of complete combustion products which is due also to the fact that there is no intensive turbulent movement of the mixture in the precombustion chamber that could impede ignition of the mixture.

As the precombustion chamber space is dependently shut off during the combustion of the auxiliary mixture therein, the combustion pressure rises there, and the flow of incomplete combustion products begins through the precombustion chamber holes into the main combustion chamber. Forming a multitude of small centers in the working charge, the precombustion chamber jets add into these centers, chemically active products obtained from an incomplete combustion of the rich mixture, and thus initiate chemical chain reactions in the centers. This leads to intensive ignition and rapid combustion of the working charge mixture which takes place not only when operating with rich mixtures on maximum loads, but also and especially, when operating with lean mixtures on low loads and when idling.

On completion of the process of combustion of the working charge, the gases expand and force the piston towards the bottom dead center. The precombustion chamber then opens and the precombustion chamber space combines with the main combustion chamber to provide a single expansion chamber. The working process thereafter continues as in other internal combustion engines.

A detailed description has been given above of the invention for engines with a precombustion chamber jet ignition and of the process of jet ignition and combustion as applied to overhead valve engines having any number of cylinders arranged in any manner. This is also applicable to side valve engines.

FIGS. 9 and 10 show an embodiment of the invention in connection with a precombustion chamber cut off by the piston and with a valveless feed of the precombustion chamber, as applied to a side valve engine with a carburetor feed of the working mixture to the cylinder. In this embodiment, the precombustion chamber space 4 is almost completely located under the spark plug 5 screwed into the head of the cylinder 1 on one side of the combustion chamber 9. The space 4 is isolated from the combustion chamber 9 by the projection 7 of the cylinder head with passages being drilled in this projection for the arrangement 10 serving to provide communication between the space 4 that is cut off by the piston 2 with the combustion chamber 9. The passages of the arrangement 10 are situated on a level below the maximum lift of the suction valve 3. At the end of the compression stroke, the space 4 is cut off by the piston 2, or by a projection provided on the piston 2 (not shown) when the piston approaches the top dead center and overlaps the projection 7. Provided in the passage 32 of the suction valve air duct is the enrichment passage 13 with tip 12 whose mouth is situated above the seat 11 of the inlet valve 3 in the vicinity of the space 4.

In this form, the cylinder is fed through the air pipe connection piece 33, with air, with its quantity being controlled by the air throttle 34, while the fuel feed to the cylinder is by local admission of a rich fuel-air mixture from the enrichment carburetor 28 through the evaporation well 14 having the inner tube 20 and the well is heated by the ribs 15 that absorb heat from the exhaust manifold or any other hot surfaces of the engine. Air into the carburetor 28 is admitted from under the throttle 34 through the air passage 41. The composition of the mixture in the enrichment carburetor 28 is regulated by the set of fuel and air nozzles 29 and a venturi 30. The quantity of rich mixture formed in the carburetor 28 is set at a certain constant ratio to the quantity of air admitted into the cylinder 1 through the air duct 32 of the inlet valve 3, and such ratio is equal to the ratio of the cross-sectional area of the passage 13 to the cross-sectional area of the passage of the air duct 32, with these ratios being approximately 0.1.

A feature of this form is that the quantity of air admitted through the air duct 32, and the quantity of rich mixture admitted through the passage 13 from the carburetor 28 are adjustable to suit the conditions of the engine load by the common throttle 34 with the rod 27 of the air pipe connection piece 33. Thus, when the suction valve of a particular cylinder is closed, the air pressure in the passage 41 at the inlet to the carburetor 28, and that at the outlet from the mouth of the passage 13 are approximately equal, and there would be no flow of mixture from the passage 13 into the passage of the air duct 32. This excludes the possibility of misadjustment of the composition of mixtures to the various cylinders in a feed system of a multicylinder engine. Rich mixture from the passage 13 through the carburetor 28 would be admitted into the cylinder 1 when only the inlet valve 3 would be opened and there would be a substantial pressure differential between the air inlet to the passage 41 leading to the carburetor 28, and the mixture outlet from the mouth of the passage 13.

Figure 5:
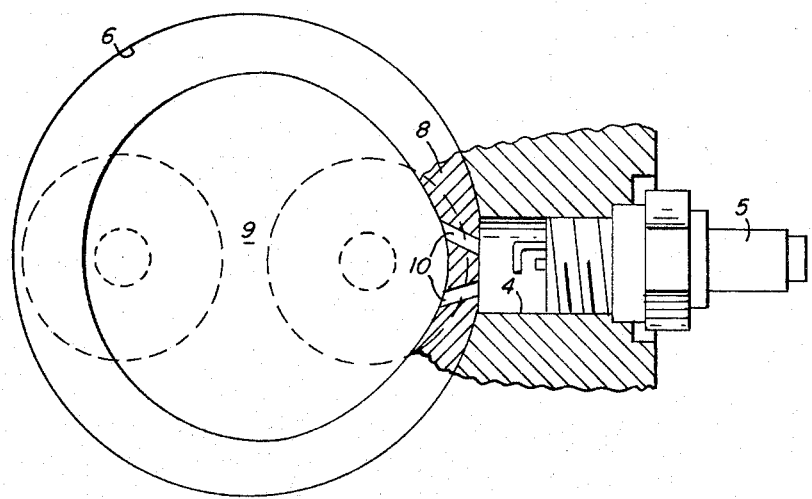
FIG. 5 shows diagrammatically a cross-section through the main combustion chamber and through the precombustion chamber of a precombustion chamber engine.

Otherwise, the entire working process, including the combustion process is similar to that described in connection with FIGS. 4 and 5.

FIGS. 11 and 12 disclose a precombustion chamber side-valve engine provided with direct fuel injection into the cylinder. The working process and the combustion process in such an engine are essentially identical with those described respecting FIG. 8.

In this engine (FIGS. 11 and 12), the precombustion chamber space 4 is situated in the head of the cylinder 1 in the vicinity of the spark plug 5 space and is cut off from the space 6 of cylinder 1 by the labyrinth lock formed by the projections 7 and 8 when the latter projection is in the vicinity of top dead center. Drilled in the cylinder head projection and piston projection, is one or several holes for the arrangement 10 by means of which the precombustion chamber communicates with the main combustion chamber 9. Mounted in the precombustion chamber is the injector 35 provided with spray nozzle 38 to supply fuel into the cylinder 1 to pulverize and distribute the fuel over the main combustion chamber 9, as well as a tip 39 having fine holes serving to restrict the penetration of large drops of fuel into the sparkplug space of the precombustion chamber. Fuel to the injector 35 is supplied during the suction stroke or the compression stroke along the tube 37 by the fuel pump 36. The quantity of fuel is regulated by the pump rack 40 operated by means of the rod 27 from a combined control system. Air is admitted into cylinder 1 during the suction stroke through the inlet valve 3 along air duct 32 from the air pipe connection piece 33 (as in FIG. 8) having a throttle 34 linked to the rod 27 of the combined control and serving to regulate the quantity of air.

Generally, this invention is a further logical development of the construction of a precombustion-chamber engine, and more particularly a development from a complex to a simpler solution of the technological solution of the problem of the application of a more efficient precombustion-chamber-jet ignition method to an extensive mass of transport internal combustion engines. The most preferred application of the new constructional scheme of the precombustion-chamber engine with a carburetor feed would apparently be to small-size transport engines, while application of the precombustion-chamber engine with direct fuel injection would be to large-size tractor, transport and stationary engines.

The described invention has been applied to internal combustion engines with a carburetor feed and direct fuel injection for which experimental studies have been carried out on medium size ($D=82$ mm., $S=114$ mm.) single-cylinder engines. At the present time, the invention is beginning to be applied to medium size ($D=92$ mm., $S=92$ mm.) automobile carburetor four-cylinder engines, and application is contemplated to small size automobile engine.

It should be stated that experimental studies of the application of the invention to a single-cylinder engine have shown that the process of combustion and the entire working process are absolutely identical with those in a precombustion-chamber engine having a permanently separated precombustion chamber with valve feed thereto, and that the invention ensures highly efficient and exceptionally steady operation.

The invention is not to be confined to any strict conformity to the showings in the drawings but changes or modifications may be made therein so long as such changes or modifications mark no material departure from the spirit and scope of the appended claims.

What we claim is:

1. An internal combustion engine provided with precombustion chamber jet ignition comprising wall means defining a cylinder and a head therefor, a piston mounted within said cylinder for reciprocation therein and provided with a main combustion chamber, said wall means defining said cylinder being provided with a precombustion chamber space above and laterally of the longitudinal center line of the cylinder, a sparkplug located in said precombustion chamber space, a projection on the wall means providing the head of the cylinder, said piston having a head, a projection on the piston head, the projections on said cylinder head and piston head being located laterally of the longitudinal center line of the cylinder and adapted to overlap when the piston approaches the top dead center thus providing a labyrinth lock between the precombustion chamber space and the main combustion chamber which, during the combustion process, cuts off the precombustion chamber space from the main combustion chamber thus providing a precombustion chamber space of relatively small volume, and means provided for one of said projections for effecting communication between the precombustion chamber space and the main combustion chamber with said last-named means being defined by a passage having inlet and outlet ends respectively communicating with the precombustion chamber space and the main combustion chamber with such passage having a sharply defined configuration at the inlet and outlet ends, a constant and relatively small area and a short length.

2. An internal combustion engine as claimed in claim 1, in which the means for providing communication between the precombustion chamber and the main combustion chamber comprises several passages located in one of said projections.

3. An internal combustion engine as claimed in claim 1, in which the labyrinth lock formed by the above overlapping projections is of a stepped, conical and equivalent shape.

4. The internal combustion engine as claimed in claim 1, further including an inlet valve located in the main combustion chamber in proximity to said precombustion chamber space, a seat for said inlet valve located in the head of said cylinder with the projection on the cylinder head being located intermediate said valve seat and said precombustion chamber space, said precombustion chamber space having a volume substantially 2–3% of the volume of the main combustion chamber with the means providing communication between the precombustion chamber space and the main combustion chamber having a total area of approximately 0.03–0.04 cm.$^2$ per cm.$^3$ of volume of the precombustion chamber space, the length of said passage being approximately 1–2 times the normal diameter thereof, a mixture duct for supplying a working mixture into the cylinder, said duct having a mouth end, said inlet valve having a disc positioned in the mouth end of the duct, enrichment passage means of an area substantially 5–10% of the area of the mixture duct means for admitting locally a rich mixture into said cylinder, the enrichment passage means having a mouth end located in the mouth end of said mixture duct means in the immediate area of the seat for the inlet valve, a carburetor provided with sets of fuel and air nozzles, a venturi and a throttle operably connected to said mixture duct means, an enrichment carburetor having sets of fuel and air nozzles, a venturi and a throttle operably connected to the enrichment passage means, a rod for combined control operably associated between said above-named carburetors, means providing an evaporation well having an inner tube means arranged between the enrichment carburetor and the enrichment passage means, and heat absorbing ribs provided on the means defining said evaporation well located in the immediate vicinity of hot engine surfaces.

5. An internal combustion engine as claimed in claim 4, in which the cylinder mixture carburetor and the enrichment carburetor are combined to form a single carburetor consisting of a cylinder section with a set of fuel and air nozzles, a venturi and a throttle, and an enrichment section with a set of fuel and air nozzles, a venturi and a throttle; the throttles of the two carburetor sections being interlinked so that they are operated from a single rod over the entire range from full-open maximum load operation to full-closed low load operation and idling; means connecting the carburetor cylinder section to the mixture duct, and means connecting the carburetor enrichment section to the enrichment passage through the evaporation well.

6. An internal combustion engine provided with precombustion-chamber-jet ignition comprising: a cylinder having a head; a piston mounted within the cylinder with a main combustion chamber and precombustion-chamber space thereabove; a sparkplug situated in the precombustion chamber space; an inlet valve located in the main combustion chamber on the precombustion chamber-space side; a projection on the head of the cylinder located between a seat for the inlet valve and the precombustion chamber space; a projection on the face of the piston located so that when the piston approaches the top dead center such projection overlaps the cylinder head projection thereby providing a labyrinth lock which, during the process of combustion cuts-off the precombustion chamber space from the main combustion chamber and forms a precombustion chamber having a volume approximately 2–3% of the volume of the main combustion chamber; an arrangement for providing communication between the precombustion chamber and the main combustion chamber, such arrangement having a constant profile and a small total area of approximately 0.03–0.04 cm.$^2$ per cm.$^3$ of the precombustion chamber volume, with sharply defined inlet and outlet edges, and a short length approximately 1–2 times its conventional diameter; an air duct for the supply of air into the cylinder, a mouth for the air duct, said inlet valve having a disc located in the mouth of the duct; an enrichment passage having an area approximately 5–10% of the air duct area for local admission of a rich mixture into the cylinder, said enrichment passage having a mouth located in the mouth of the air duct in the vicinity of the inlet valve seat on the precombustion chamber space side; an air pipe connection piece provided with a throttle for the regulation of air admission into the cylinder, said air pipe connection piece being connected to the air duct; an enrichment carburetor provided with a set of fuel and air nozzles, a venturi and a throttle connected to the enrichment passage; a rod for combined control between the throttles of the air pipe connection piece and the enrichment carburetor; an evaporation well arranged between the enrichment carburetor and the enrichment passage, and heat-absorbing ribs on the evaporation well located in the vicinity of hot engine surfaces.

7. An internal combustion engine as claimed in claim 6, in which the air pipe connection piece and enrichment carburetor are combined to form a single carburetor consisting of an air pipe connection piece with a throttle and of a carburetor section with a set of fuel and air nozzles, a venturi and a throttle; the throttle of the air pipe connection piece and the throttle of the carburetor section being interlinked so that they are operated from a single rod over the entire range from full-open maximum load operation to full-closed low load operation and idling; means connecting the air pipe connection piece to the air duct, and means connecting the carburetor section to the enrichment passage through the evaporation well.

8. The internal combustion engine as claimed in claim 4, in which said enrichment carburetor is connected at the inlet thereof to the mixture duct means below the throttle of the cylinder mixture carburetor and at the outlet to the enrichment passage means.

9. An internal combustion engine as claimed in claim 8, in which the cylinder mixture carburetor and the enrichment carburetor are combined to form a single carburetor consisting of a cylinder section having a set of fuel and air nozzles, a venturi, throttle, and rod for control of the engine, and an enrichment section having a set of fuel nozzles and a venturi; the enrichment section communicating at the inlet with the cylinder section downstream of its throttle, and at the outlet with the enrichment passage through the evaporation well.

10. An internal combustion engine provided with precombustion-chamber-jet ignition comprising: a cylinder having a head; a piston mounted within the cylinder; a main combustion chamber and precombustion-chamber space thereabove; a spark plug situation in the above precombustion chamber space; an inlet valve located in the main combustion chamber on the precombustion chamber-space side; a projection on the head of the cylinder between a seat for the inlet valve and the precombustion chamber space; a projection on the face of the piston located so that when the piston approaches the top dead center such projection the cylinder head projection thereby providing a labyrinth lock which during the process of combustion cuts-off the precombustion chamber space from the main combustion chamber and forms a precombustion chamber having volume approximately 2–3% of the main combustion chamber volume; an arrangement for providing communication between the precombustion chamber and the main combustion chamber, such arrangement having a constant profile and a small total area of approximately 0.03–0.04 cm.$^2$ per cm.$^3$ of the precombustion chamber volume, with sharply defined inlet and outlet edges, and a short length approximately 1–2 times its conventional diameter; an air duct for the supply of air into the cylinder, a mouth for the air duct, said inlet valve having a disc located in the mouth of the duct; an enrichment passage having a area approximately 5–10% of the air duct area for local admission of a rich mixture into the cylinder, the enrichment passage having a mouth located in the mouth of the air duct in the vicinity of the inlet valve seat on the precombustion chamber space side; an air pipe connection piece provided with a throttle for the regulation of air admission into the cylinder and for control of the engine and being connected to the air duct; an enrichment carburetor provided with a set of fuel and air nozzles and a venturi, such carburetor being connected at the inlet to the air pipe connection piece under its throttle, and at the outlet to the above enrichment passage; an evaporation well arranged between the carburetor and the enrichment passage; and heat absorbing ribs on the evaporation well located in the vicinity of hot engine surfaces.

11. An internal combustion engine as claimed in claim 10, in which the air pipe connection piece and the enrichment carburetor are combined to form a single carburetor consisting of an air pipe connection piece with a throttle for the regulation of air admission into the cylinder and for the control of the engine, and of a carburetor section provided with a set of fuel and air nozzles and a venturi; the enrichment section communicating at the inlet with the air pipe connection piece downstream of the throttle, and at the outlet with the enrichment passage through the evaporation well.

12. An internal combustion engine as claimed in claim 4, in which the enrichment passage means for local admission of the rich mixture into the cylinder is drilled in the body of the mixture duct, with the mouth of such passage means being in the form of a tip, one end of the latter being connected to the drilled enrichment passage means, while the other is situated in the mouth of the mixture duct in the vicinity of the inlet valve seat.

13. An internal combustion engine as claimed in claim 6, in which the enrichment passage for local admission of the rich mixture into the cylinder, is drilled in the body of the air duct, with the mouth of such passage being in the form of a tip, one end of the latter being connected to the drilled enrichment passage, while the other is situated in the mouth of the air duct in the vicinity of the inlet valve seat side.

14. An internal combustion engine as claimed in claim 5, in which the carburetor enrichment section is provided with a cock type throttle ensuring accurate regulation of the admission of a small quantity of enrichment fuel-air mixture.

15. An internal combustion engine as claimed in claim 7, in which the carburetor enrichment section is provided with a cock type throttle for ensuring accurate regulation of the admission of a small quantity of rich fuel-air mixture.

16. An internal combustion engine provided with precombustion chamber jet ignition comprising: a cylinder having a head; a piston mounted within the cylinder with a main combustion chamber and a precombustion chamber space thereabove; a sparkplug situated in the precombustion chamber space; an inlet valve for air admission into the cylinder; an air duct having a mouth, said inlet valve having a disc situated in the mouth of the air duct; a projection on the head of the cylinder arranged around the precombustion chamber space; a projection on the face of the piston arranged so that when the piston approaches the top dead center such projection overlaps the cylinder head projection thereby providing a labyrinth lock which during the process of combustion cuts-off the precombustion-chamber space from the main combustion chamber and forms a precombustion chamber having a volume approximately 2–3% of the main combustion chamber volume; an arrangement for providing communication between the precombustion chamber and the main combustion chamber, such arrangement having a constant profile and a small total area of approximately 0.03–0.04 cm.$^2$ per cm.$^3$ of the precombustion chamber volume, with sharply defined inlet and outlet edges, and a short length approximately 1–2 times its conventional diameter; an injector provided with a spray nozzle installed in the air duct for the injection of fuel into the cylinder through the mouth of the air duct when the above inlet valve opens in a direction towards the precombustion-chamber space; a fuel pump having a regulator, the rack of the pump regulating the admission of fuel into the cylinder during the suction stroke; an air pipe connection piece provided with a throttle for the air duct with the throttle regulating the admission of air into the cylinder; and a rod for combined control interlinking the rack of the fuel pump with the throttle of the air pipe connection piece.

17. An internal combustion engine provided with precombustion-chamber-jet ignition comprising: a cylinder having a head; a piston mounted within the cylinder with a main combustion chamber and a precombustion chamber space thereabove; a sparkplug situated in the precombustion chamber space; a projection in the head of the cylinder arranged around the precombustion-chamber space; a projection on the face of the piston being arranged so that when the piston approaches the top dead center such projection overlaps the cylinder head projection thereby providing a labyrinth lock which during the process of combustion cuts off the precombustion chamber space from the main combustion chamber and forms a precombustion chamber having a volume approximately 2–3% of the main combustion chamber volume; an arrangement for providing communication between the precombustion chamber and the main combustion chamber, such arrangement having a constant profile and a small total area of approximately 0.03–0.04 cm.$^2$ per cm.$^3$ of the precombustion-chamber volume, with sharply defined inlet and outlet edges, and a short length approximately 1–2 times its conventional diameter; an injector provided with a spray nozzle for the injection of fuel into the cylinder, such injector being arranged in the precombustion chamber space in the vicinity of the sparkplug; an injector tip mounted downstream of the spray nozzle and having small holes on its surface extending into the precombustion chamber space to restrict the penetration of large size fluid fuel drops from the injector onto the sparkplug; a fuel pump provided with a regulator, the rack of the pump regulating the admission of fuel into the cylinder during the suction or compression stroke; an air pipe connection piece having a throttle for the air duct, the throttle regulating the admission of air into the cylinder; and a rod of a combined control interlinking the rack of the fuel pump with the throttle of the air pipe connection piece.

18. An internal combustion engine as claimed in claim 17, in which the fuel injector is fitted with a spray nozzle having two passages at an angle with respect to each other and located in a plane passing through the center line of the injector and the center line of the cylinder with two jets escaping from the passages under the pressure created by the fuel pump, such jets on meeting pulverize the fuel for forming a flat fuel jet in the main combustion chamber, the plane of the latter jet being approximately at right angles to the center line of the cylinder, and covering a greater or smaller area of the cylinder, depending on the conditions of operation of the engine, and thus on fuel consumption and the range of action of the injector.

19. An internal combustion engine as claimed in claim 17, in which the fuel injector spray nozzle is located in the main combustion chamber in the vicinity of the precombustion chamber space, and injects fuel into the cylinder through the precombustion chamber space for enriching the fuel mixture at all conditions of operation of the engine, irrespective of fuel consumption and the range of action of the fuel jet.

20. An internal combustion engine as claimed in claim 17 in which the fuel injector with the spray nozzle is situated in main combustion chamber so that it injects the fuel in a direction towards the precombustion-chamber space thus enriching the fuel mixture at all conditions of operation of the engine irrespective of fuel consumption in the cylinder.

21. A method for regulating the feed to an internal combustion engine provided with a main combustion chamber, a precombustion chamber space, a sparkplug in the precombustion chamber space, means operative when the piston approaches top dead center to cut off the precombustion chamber space from the main combustion chamber for forming a precombustion chamber of relatively small volume and means for providing communication between the precombustion chamber and the main combustion chamber, including the steps of leaning a fuel mixture at a point remote from the precombustion chamber space, enriching the fuel in the vicinity of the precombustion chamber space to possess an air-fuel ratio of $\alpha_2=0.1$–$0.2$, and admitting the enriched mixture into the precombustion chamber space and a working mixture into the main combustion chamber during the suction stroke whereby upon compression the working mixture is partly forced into the enriched mixture in the precombustion chamber space via the means providing communication between the respective chambers thereby forming in the precombustion chamber at the moment of sparkplug ignition a composition having an air-fuel ratio of approximately $\alpha_{pc}=0.4$–$0.7$.

22. A method for regulating the power of an internal combustion engine provided with a cylinder, a piston, a main combustion chamber, a precombustion chamber space, a sparkplug in the precombustion chamber space, means operative when the piston approaches top dead center to cut off the precombustion chamber space from the main combustion chamber for forming a precombustion chamber of relatively small volume and means for providing communication between the precombustion chamber and the main combustion chamber, including the steps of admitting a working mixture into the main combustion chamber and an enriched mixture into the precombustion chamber space during the suction stroke whereby upon compression the working mixture is partly forced into the enriched mixture in the precombustion chamber space via the means providing communication between the respective chambers and filling the cylinder and enriching the mixture to possess an air-fuel ratio of approximately $\alpha=0.95$ for maximum load operation or partially filling the cylinder and leaning the mixture to possess an air-fuel ratio of $\alpha=1.6$ and higher for low load operation and idling.

References Cited by the Examiner
UNITED STATES PATENTS

| | | | |
|---|---|---|---|
| 887,393 | 5/1908 | Haselwander | 123—32.2 |
| 2,256,776 | 9/1941 | Kammer | 123—132.2 |
| 2,690,741 | 10/1954 | Broderson | 123—32 |
| 2,799,257 | 7/1957 | Stumpfig et al. | 123—30.21 |
| 2,808,036 | 10/1957 | Von Seggern et al. | 123—32 |
| 3,015,321 | 1/1962 | Stumpfig et al. | 123—30.21 |
| 3,079,901 | 3/1963 | Hallberg | 123—32.2 |

FOREIGN PATENTS

| | | |
|---|---|---|
| 927,887 | 6/1963 | Great Britain. |

MARK NEWMAN, *Primary Examiner.*

RICHARD B. WILKINSON, *Examiner.*

L. M. GOODRIDGE, *Assistant Examiner.*